United States Patent [19]
Durst

[11] 4,075,981
[45] Feb. 28, 1978

[54] ROTARY INTERNAL COMBUSTION ENGINE

[75] Inventor: David L. Durst, Fort Collins, Colo.

[73] Assignee: Duane Burton, Boulder, Colo.

[21] Appl. No.: 677,337

[22] Filed: Apr. 15, 1976

[51] Int. Cl.² .......................................... F02B 53/08
[52] U.S. Cl. .................... 123/8.31; 60/901;
418/246; 418/263
[58] Field of Search ................ 123/8.45, 8.31, 8.33;
418/246, 261, 263, 264

[56] References Cited

U.S. PATENT DOCUMENTS

| | | | |
|---|---|---|---|
| 1,016,764 | 2/1912 | Noyes | 123/8.31 |
| 1,173,327 | 2/1916 | Thurmond | 123/8.31 |
| 1,249,881 | 12/1917 | Anglada | 123/8.45 |
| 2,366,213 | 1/1945 | Pover | 123/8.31 |
| 2,939,438 | 6/1960 | Bush | 123/8.31 |
| 3,215,128 | 11/1965 | Poulson | 123/8.31 |
| 3,797,464 | 3/1974 | Abbey | 123/8.33 |
| 3,865,085 | 2/1975 | Stenberg | 123/8.33 |
| 3,872,839 | 3/1975 | Russell | 123/8.31 |
| 3,921,596 | 11/1975 | Schulz | 123/8.45 |
| 3,921,597 | 11/1975 | Franco | 123/8.31 |

Primary Examiner—Clarence R. Gordon
Attorney, Agent, or Firm—Burton & Dorr

[57] ABSTRACT

A rotary internal combustion engine is disclosed herein and includes two confronting but spaced apart side casings which comprise part of the overall engine housing and a rotor located between the side casings, mounted around a rotatable shaft and extending between the casings. The engine disclosed herein has a number of improved features including improved sealing vanes which cooperate with the rotor and side casings to define various function chambers in the engine. The engine also includes more efficient combustion chambers including improved check valve mechanisms for introducing fuel into the combustion chambers. The engine also provides greater power generation due to an improved angle of combustion onto the lobes of the rotor. The engine further includes a chamber for delivering lubricant to the various vanes defining the chambers, which vanes are movable in synchronism with the rotor, and a compressed air chamber for delivering air from the engine directly to the engine's afterburner so as to further dilute combustion residue applied to the afterburner from the combustion chamber.

14 Claims, 16 Drawing Figures

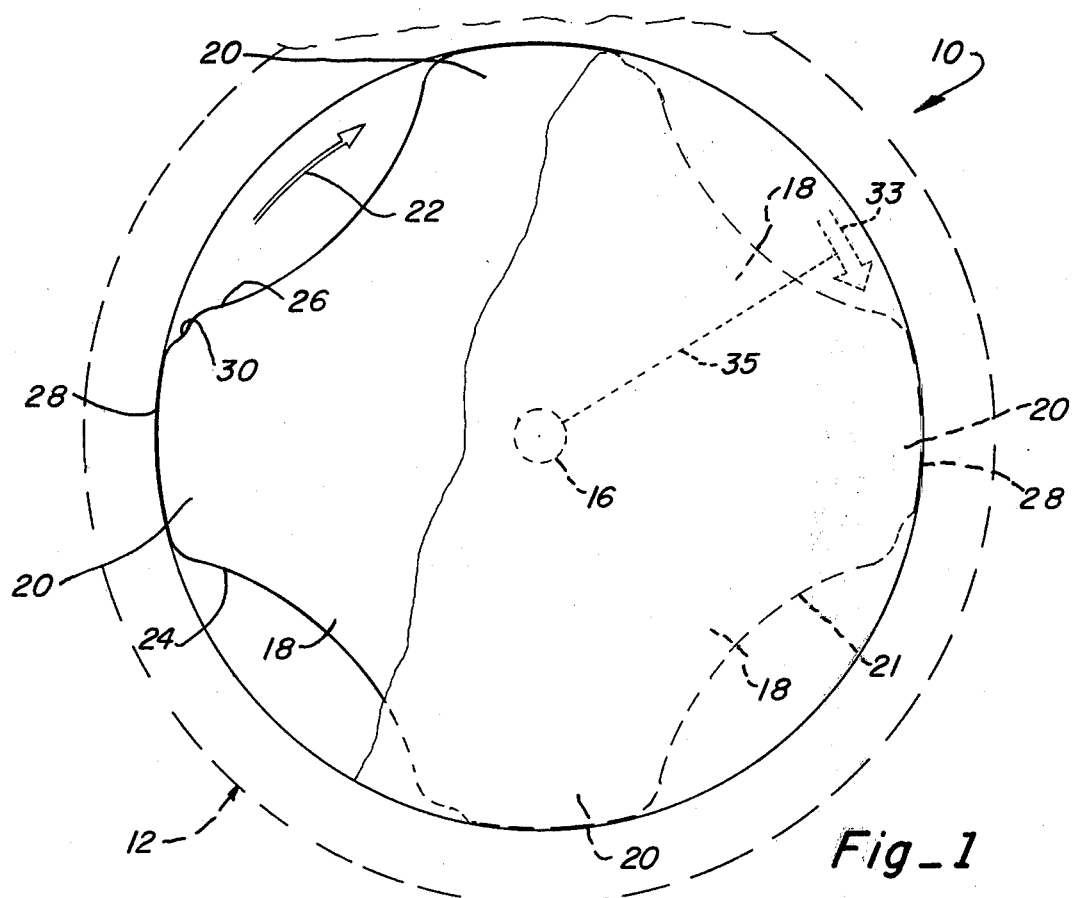
Fig_1
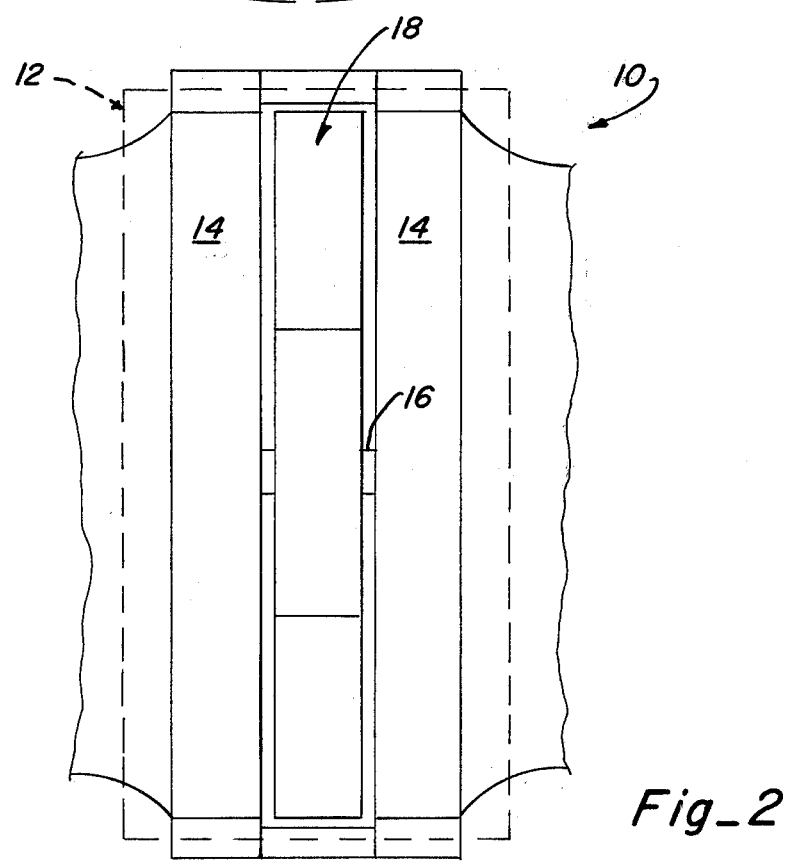
Fig_2

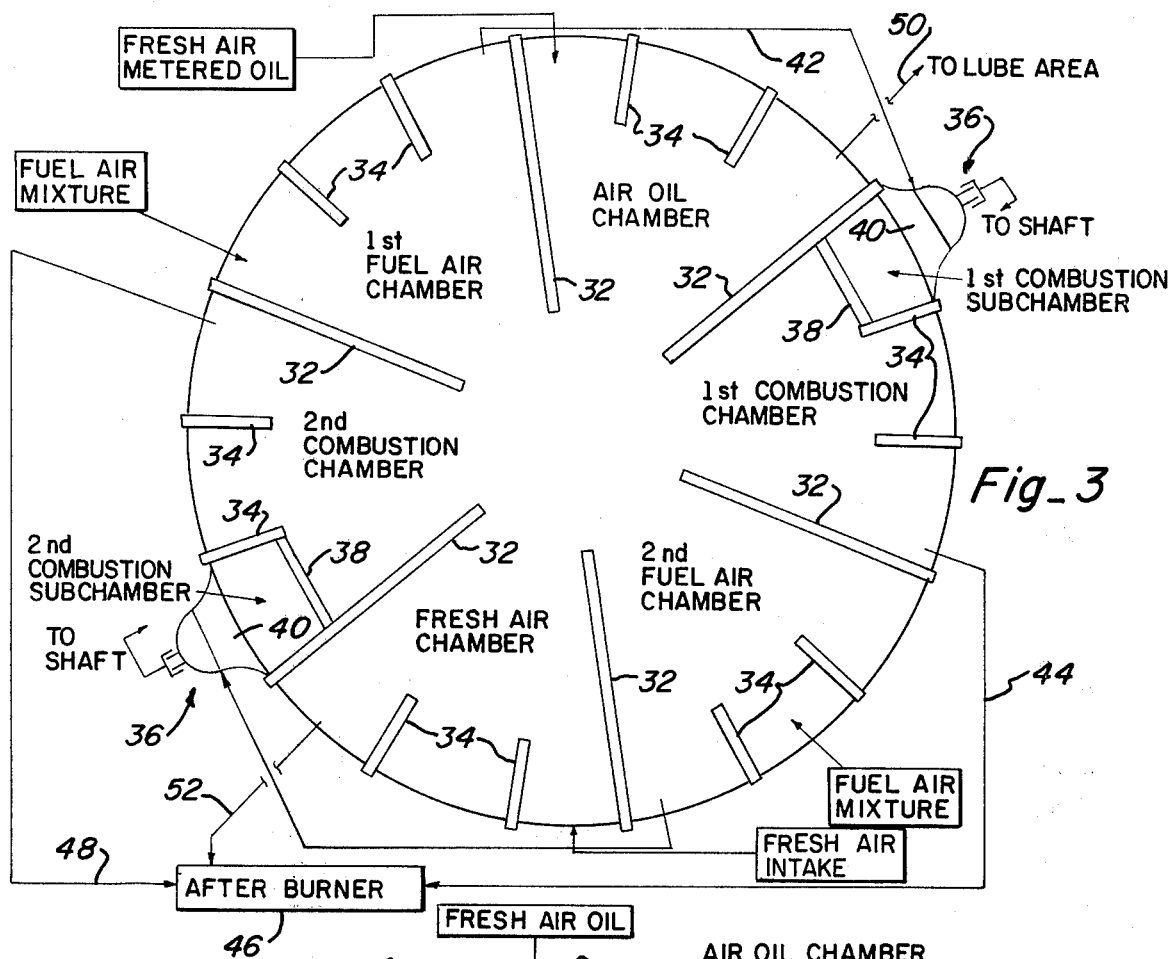
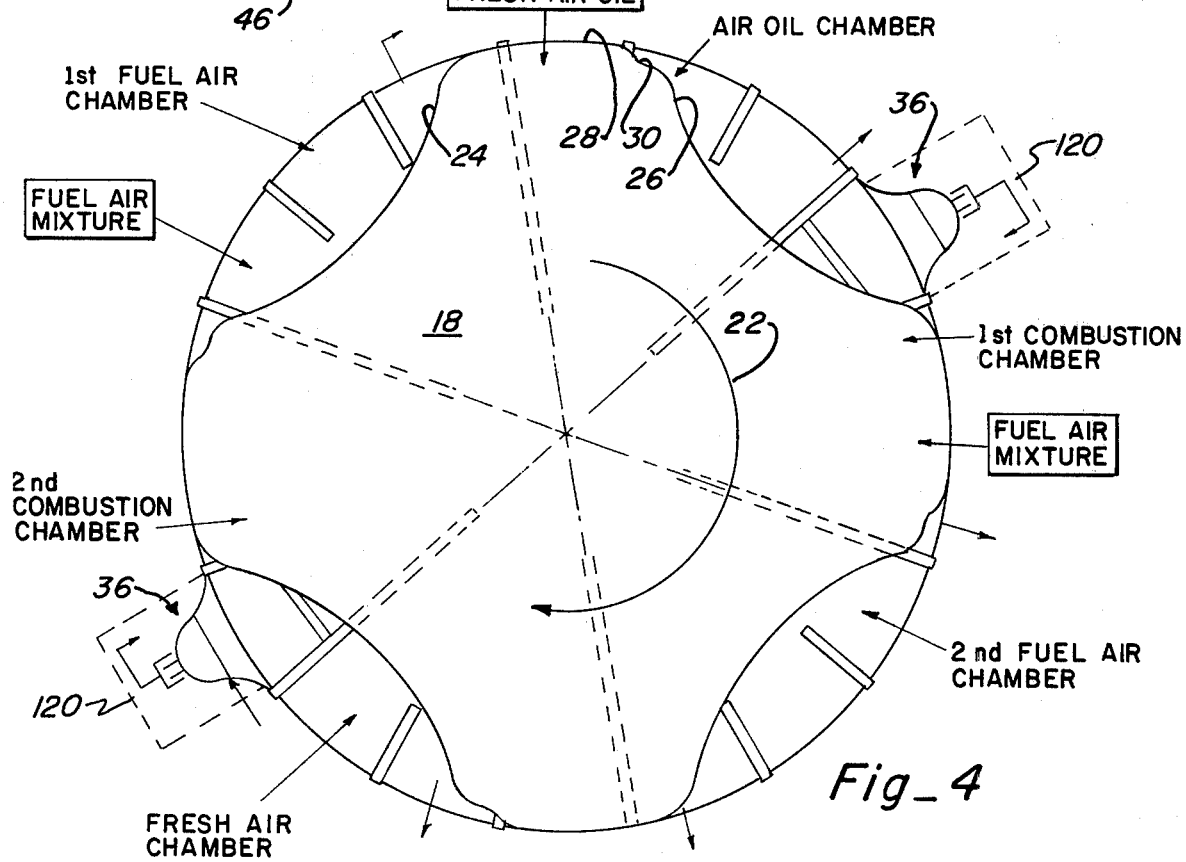

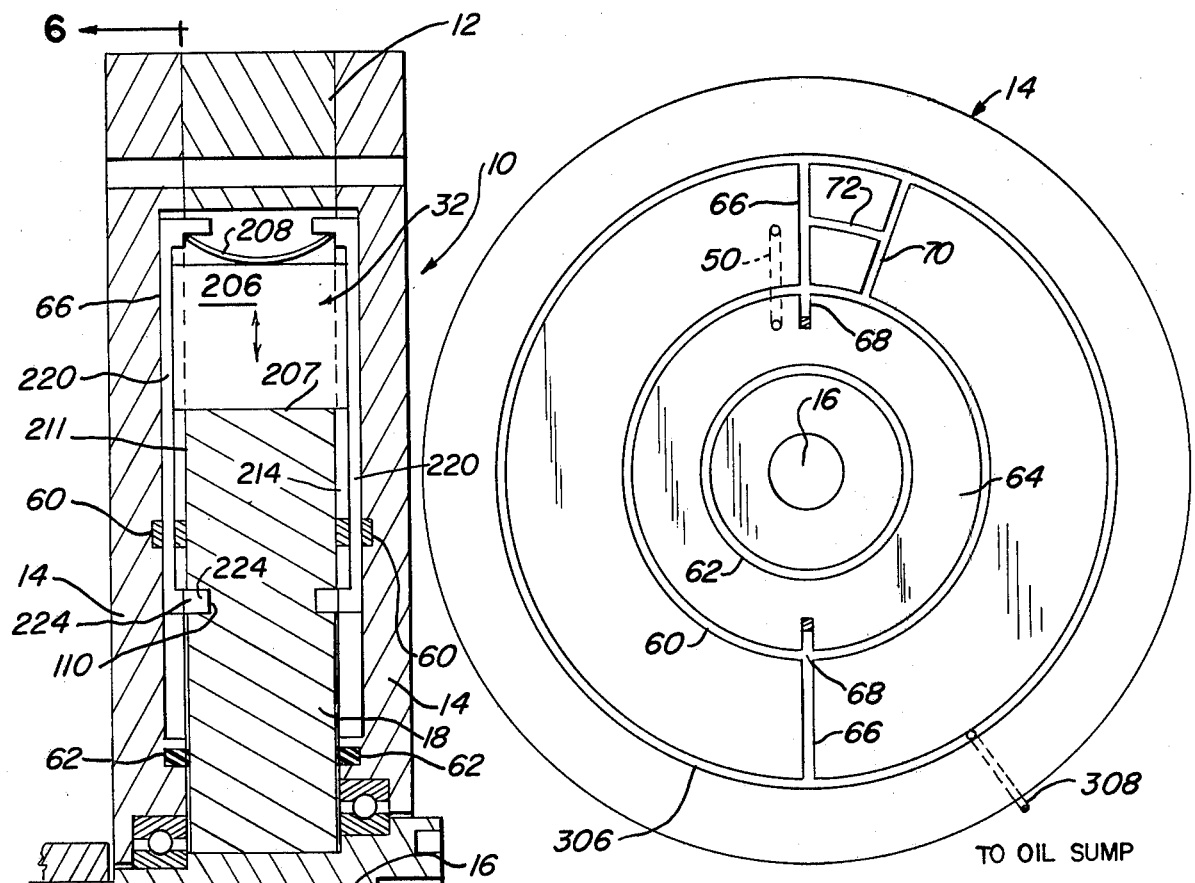
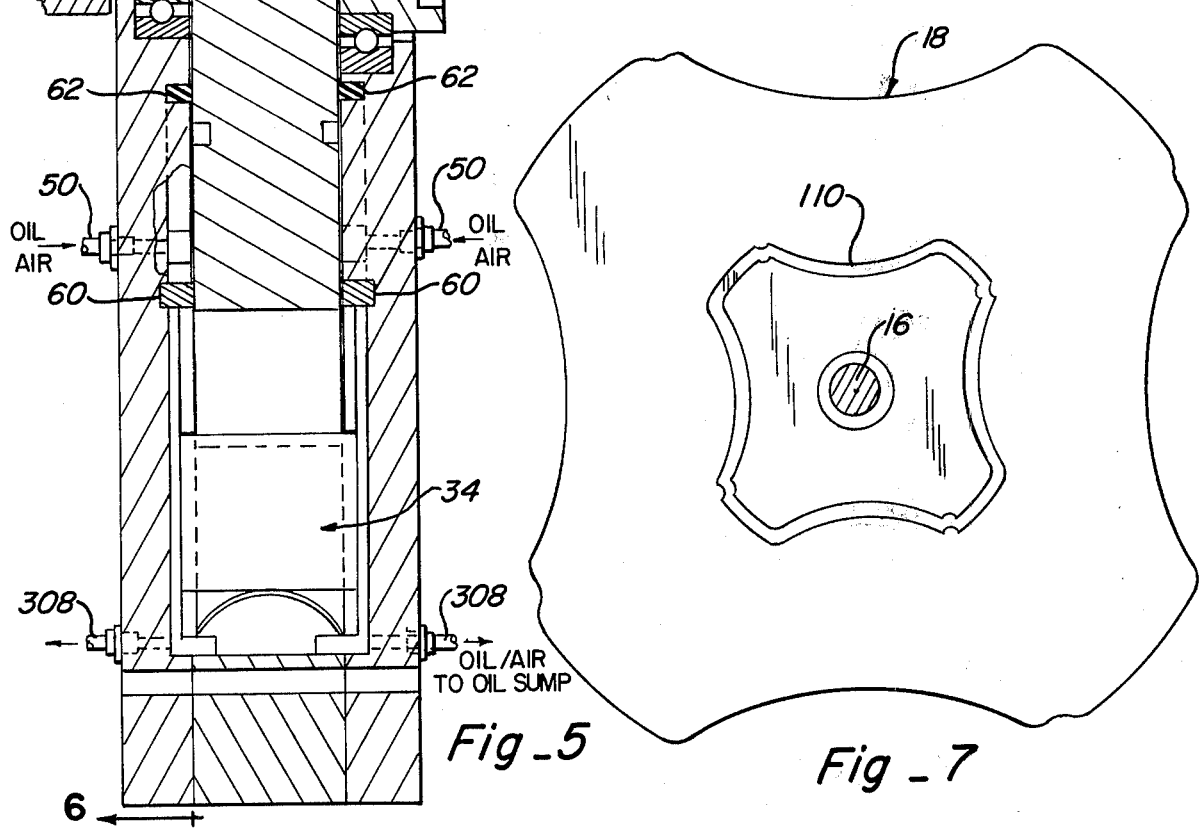
Fig_5
Fig_6
Fig_7

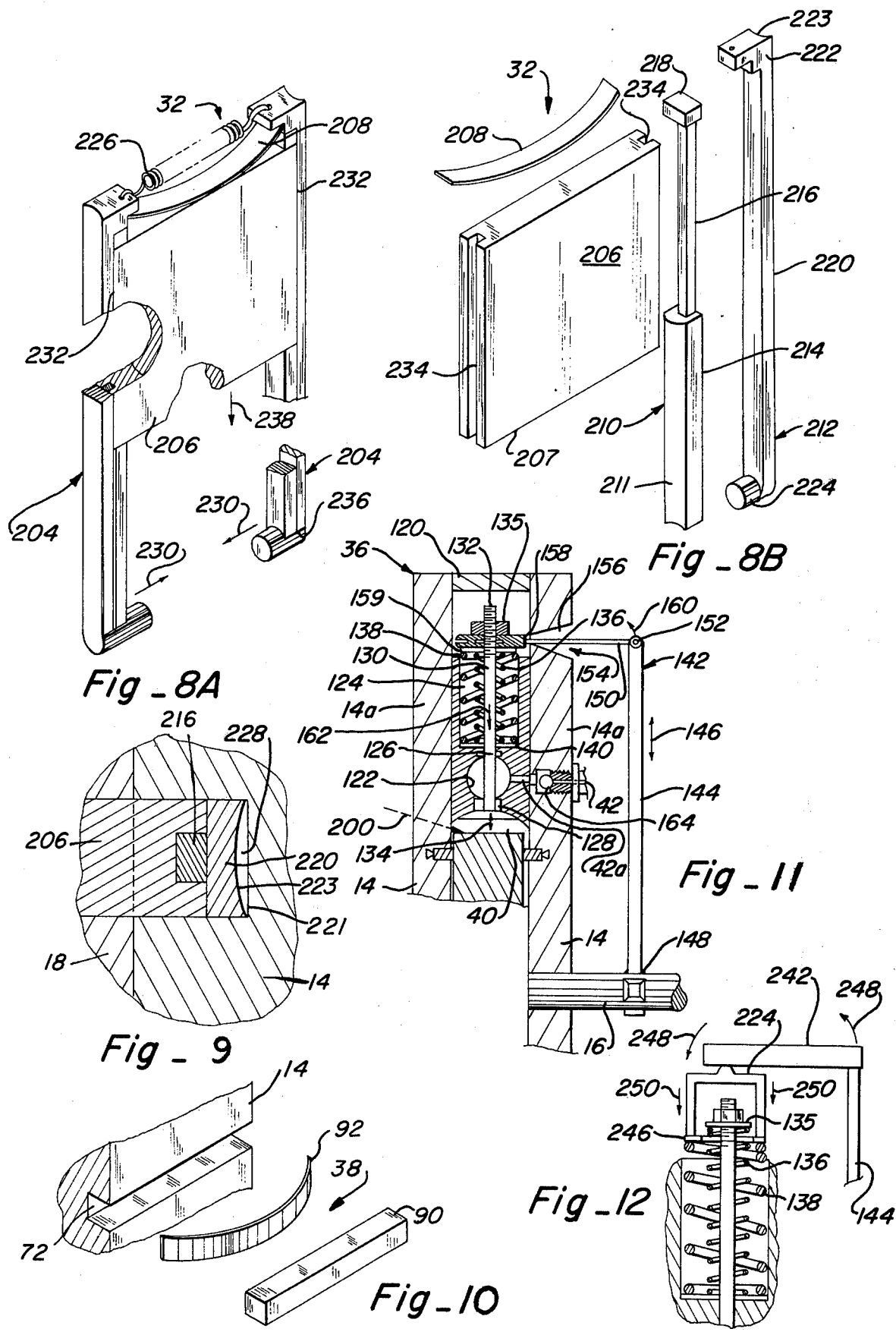

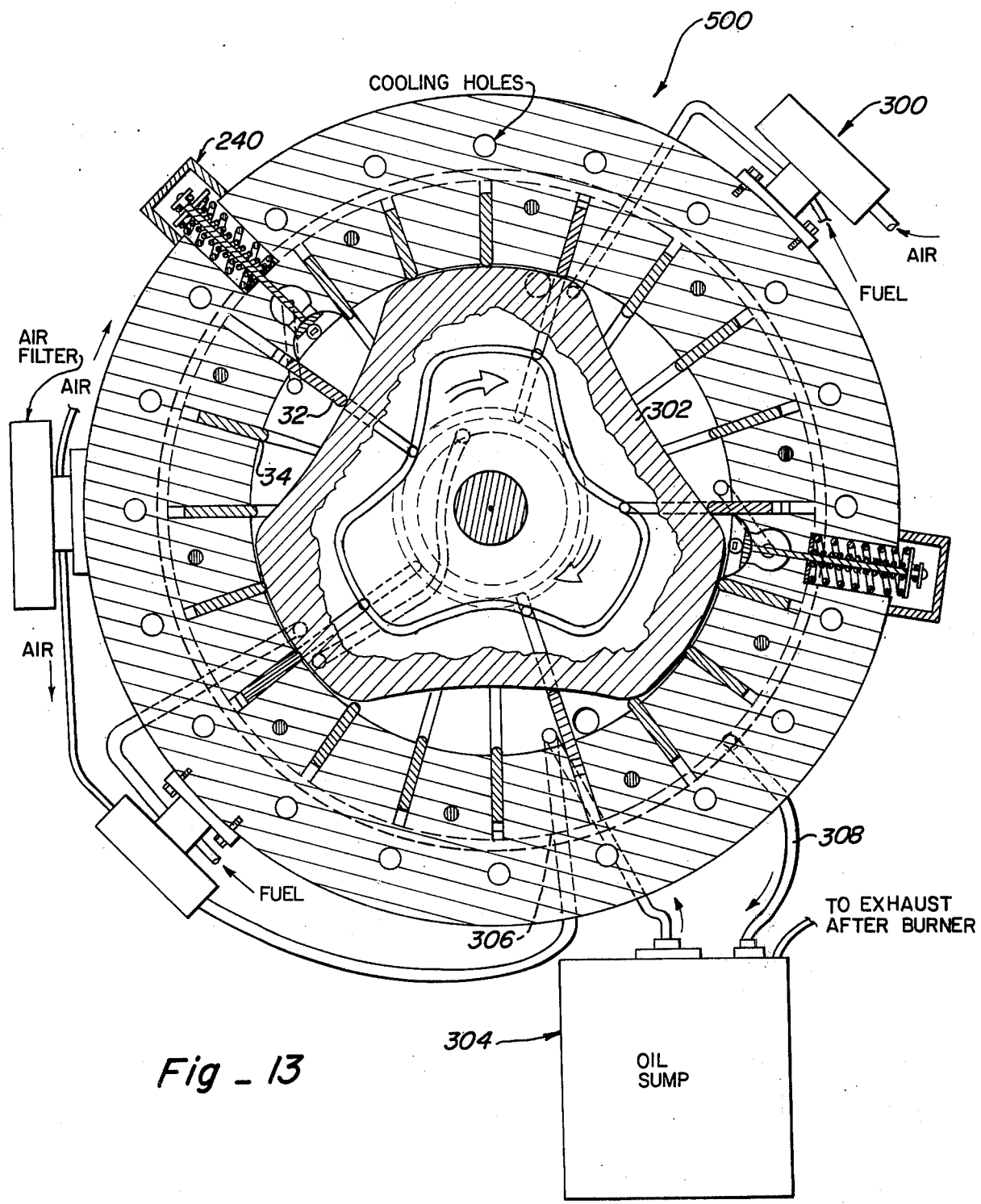
Fig _ 13

ROTARY INTERNAL COMBUSTION ENGINE

BACKGROUND OF THE INVENTION

The present invention is directed generally to internal combustion engines and more particularly to an improved rotary internal combustion engine.

A typical rotary internal combustion engine of the type to which the present invention is directed includes two confronting but spaced apart side casings comprising part of the overall engine housing or casing and a rotor located between these side casings and mounted for rotation to a rotatable shaft extending between the side casings. A number of radially outwardly extending and circumferentially spaced lobes, preferably three or four in number, comprising part of the rotor move through a series of function chambers defined between the side casings as the rotor rotates on its shaft. These chambers include, for example, a fuel compression chamber and a combustion chamber that are completely isolated from one another by means of sealing vanes located over and against the outer periphery of the rotor and between the rotor and side casings. A fuel-air mixture is injected into the fuel compression chamber and is compressed therein as the rotor moves into and through this chamber. This compressed mixture is delivered to the combustion chamber where it is fired to provide the driving force for the rotor. The combustion residue which results from this firing is delivered from the combustion chamber to an afterburner where it is further burned before being emitted to the ambient surroundings.

The foregoing description of a typical rotary internal combustion engine is, of course, a brief summary of how this type of engine works and does not include many of the typical details generally well known to those skilled in the art. However, the areas just discussed among others to be discussed hereinafter are areas improved upon by the rotary engine construction of the present invention, as will also be seen hereinafter.

One problem found with the typical rotary internal combustion engine of the past is that the sealing vanes or actual vane mechanisms used in separating the various function chambers do not adequately isolate these chambers, especially after prolonged operation. Another problem or rather area which may be improved resides in the area of combustion. More specifically, many of the rotary engines of the past do not efficiently combust the compressed fuel as it enters into the combustion chamber due to the construction of the chamber itself, due to the firing mechanism or both.

As will be seen hereinafter, the present invention is directed to the deficiencies just discussed. As will also be seen, the present invention is directed to other improvements in the rotary engine of the past including, for example, a more efficient way of afterburning combustion residue. In addition, the engine of the present invention is especially suitable for use with fuel injection and many of its components can be constructed of a ceramic material.

SUMMARY OF THE INVENTION

An object of the present invention is to provide a rotary internal combustion engine which includes a number of uncomplicated and yet reliable improvements over typical rotary engine constructions of the past.

One particular object of the present invention is to provide a rotary internal combustion engine with improved vane mechanisms which separate the engine into a number of function chambers.

Another object of the present invention is to maintain these vane mechanisms more efficiently in sealing engagement against the rotor, particularly the outer periphery of the rotor as the latter rotates, specifically by moving these vanes in a predetermined way in synchronism with the rotor.

Still another object of the present invention is to provide an efficient way of lubricating the vane mechanisms as they move in synchronism with the rotor.

Yet another object of the present invention is to more reliably maintain the vane mechanisms in continued sealing engagement with the rotor during prolonged operation of the engine even though the vane mechanisms are subjected to continuous wear.

Another object of the present invention is to provide a rotary internal combustion engine with uncomplicated and yet efficient combustion capabilities.

Another object of the present invention is to provide greater power output due to a novel mechanical advantage achieved by directing the power of combustion at a greater distance from the center of the rotor.

Another object of the present invention is to provide this uncomplicated and yet efficient combustion capability at least in part by means of a combustion subchamber defined in part by the lobes of the rotor and a number of vane mechanisms.

Still another object of the present invention is to provide this uncomplicated and yet efficient combustion capability in part by means of an improved fuel intake valve mechanism which operates in synchronism with the rotor to deposit compressed fuel into the subchamber just discussed.

Another specific object of the present invention is to provide a rotary internal combustion engine with an uncomplicated and yet reliable arrangement for more efficiently afterburning combustion residue resulting from operation of the engine.

Another object of the present invention is to provide this afterburning by compressing air within the engine itself, utilizing a fresh air compression chamber, and delivering this compressed fresh air to the afterburner for more efficiently burning the residue.

Other objects include using the engine itself as part of an oil pump in a closed lubricating system.

The rotary internal combustion engine to which the present invention is directed includes a pressurized housing having two confronting, but spaced apart side casings defining therebetween a plurality of function chambers circumferentially spaced about a rotatably mounted shaft extending between the casings. The engine also includes a rotor having a non-circular outer periphery, actually a number of radially outwardly extending and circumferentially spaced apart rotor lobes. The rotor is located between the side casings and is mounted around the shaft for rotation therewith, such that the rotor lobes successively move into and through the various chambers.

In accordance with one aspect of the present invention, the rotary engine includes a plurality of specifically designed vane mechanisms respectively positioned between the function chambers and cooperating with both the rotor and side casings for substantially fluid sealing the chambers from one another. Each of these mechanisms includes a pair of elongated side vanes located on opposite sides of the rotor, in engagement with the side casings and in slideable engagement with the opposite sides of the rotor. Each vane mechanism also includes a cross vane extending between the side vanes across and in engagement with the outer periphery of the rotor and movable in radially directed reciprocal fashion. An arrangement operatively connected with these vane mechanisms and with the rotor causes the vane mechanisms, particularly the cross vanes, to reciprocally move during rotation of the rotor in a way which causes the cross vanes to stay in engagement with the outer periphery of the rotor, actually with the outer periphery of the rotor lobes and therebetween, as the rotor rotates.

In a preferred embodiment, the cross vanes are connected with associated side vanes, and the arrangement, for reciprocally moving the vane mechanisms, includes a pair of substantially identical cam grooves located in the opposite sides of the rotor in alignment with one another. These cam grooves are located inwardly of the outer periphery of the rotor and take substantially the same shape of the rotor's periphery. A pair of side vane support grooves for each vane mechanism is located in the side casings, on opposite sides of the rotor and face the latter. These side grooves extend radially outwardly from points approximate the cam grooves in the rotor to points adjacent to the outer periphery of the rotor. The side vanes of each vane mechanism are respectively located in these side grooves for radial movement therein. In addition, cam means connected with the side vanes are disposed within the cam grooves in the rotor whereby, during rotation of the rotor, the interaction between the cam grooves and cam means cause the side vanes and, therefore, the cross vanes to reciprocate radially in synchronism with the rotor to maintain the cross vanes in engagement with the outer periphery of the rotor.

Because of this continuous radial movement of the vane mechanisms, it is desirable, if not necessary, to at least periodically, but preferably continuously, lubricate between the casing grooves and side vanes of the vane mechanisms, as the latter reciprocally move. As will be seen hereinafter, to provide this lubrication, the rotary engine includes two pairs of sealing rings respectively located on opposite sides of the rotor between the rotor and side casings and in sealing engagement therewith. Each pair of sealing rings is comprised of an inner sealing ring located concentrically around the rotating shaft radially inwardly of the aforediscussed cam grooves in the rotor and an outer sealing ring located concentrically around the inner ring radially outwardly of these cam grooves. Each pair of rings defines what may be referred to as a circumferential lubricant receiving area therebetween. The engine also includes means for delivering a liquid lubricant, preferably a mixture of air and oil, into the lubricant receiving area. This lubricant passes from the receiving area into the cam grooves in the rotor and into the side grooves in the side casings to lubricate these various grooves so as to facilitate movement of the side vanes within the side grooves and the cam means within the cam grooves. In accordance with a preferred embodiment, this means for delivering the liquid lubricant to the lubricant receiving areas includes one of the function chambers, specifically an air-oil chamber, means for delivering lubricant into this chamber, means including the rotor for compressing the lubricant and means for directing the compressed lubricant to the lubricant receiving areas between the sealing rings.

In accordance with still another feature of the present invention, the means for delivering lubricant just discussed simultaneously delivers air mixed with the lubricant. This air is also compressed and directed by the previously discussed directing means into the lubricant receiving areas where it moves up into the side grooves of the side casing behind the side vanes against the rotor so as to bias the side vanes against the rotor. In this regard, as will be seen hereinafter, the side vanes are moveable into and against the side walls of the rotor, relative to their associated cross vanes so as to remain in slideable engagement with the rotor side walls even though the side vanes have a tendency to wear during prolonged operation. This combination of oil and air under pressure ultimately bleeds out of the engine and into an oil sump where the air is separated from the oil. The separated air is preferably delivered to the afterburner and the oil is delivered back through the engine system.

The cross vanes also have a tendency to wear in a similar manner. Hence, in accordance with a further feature of the present invention, each cross vane is connected with its associated side vanes so as to move towards the outer periphery of the rotor relative to the side vanes. Each vane mechanism includes means, for example, a leaf spring, for contiguously biasing the cross-vanes in slideable engagement with the outer periphery of the rotor, thereby maintaining the cross vanes, like the side vanes, in engagement with the rotor regardless of wear to the cross vanes due to their slideable engagement with the latter.

As stated previously, the rotary internal combustion engine to which the present invention is directed includes a number of function chambers, including a combustion chamber for combusting a fuel mixture therein. As also stated previously, the residue resulting from this combustion is removed from the combustion chamber to a point outside the engine, specifically to an afterburner which is provided for further burning the residue, actually any unburned fuel comprising a part of the residue, before the latter is allowed to enter the ambient surroundings. In accordance with another feature of the present invention, the rotary engine may include as one of its function chambers an air chamber and means for delivering fresh air to this chamber. As the rotor, specifically one lobe of the rotor, passes into this air chamber it compresses the air therein. This compressed air is delivered by suitable passage means to the outside point, specifically to the afterburner so as to aid in combusting or burning the residue, specifically the unburned fuel. In this way, a separate supply of compressed air, apart from the engine itself, is not necessary. In addition to or in lieu of this separate supply of air, the air from the oil sump can be used in aiding in burning the residue in the afterburner.

In accordance with still another feature of the rotary engine constructed in accordance with the present invention, each of the rotor lobes has a backside, a frontside, and outer surface extending from the backside towards the frontside and a radially inward chamfered surface connecting the outer surface with the frontside. As a given rotor lobe moves into the aforediscussed combustion chamber directly under the compressed fuel entry area which receives compressed fuel from the fuel-air chamber, it cooperates with this entry area and an arrangement of fluid sealing means, preferably including one of the previously discussed vane mechanisms, to define a combustion sub-chamber smaller than, but within the overall combustion chamber for further compressing the compressed mixture of fuel and air. This further compressed mixture is ignited within the sub-chamber by suitable means. In a preferred embodiment, the arrangement of the sealing means includes sealing means located adjacent to and upstream from the entry area, preferrably one of the vane mechanisms discussed heretofore, second means located adjacent to and downstream from the entry area, preferrably a secondary vane which extends across and in engagement with the outer periphery of the lobes when the latter pass under the second means, and third means extending from the second sealing means to the first sealing means radially inwardly of the entry area. Both the second sealing means and third sealing means, like the vane mechanisms discussed above, extend between the rotor and side casings and in engagement therewith.

In accordance with a further feature of the rotary engine construction of the present invention, a specifically designed valve mechanism is provided for metering a predetermined amount of the compressed mixture of fuel and air to the entry area in the combustion chamber at predetermined points in time during rotation of the rotor. This valve mechanism includes a valve moveable between an open position for allowing the compressed mixture to pass into the entry area and a closed position for preventing the mixture from passing into the entry area. The valve mechanism also includes coupling means connected with the valve and cooperating with the rotating shaft supporting the rotor so as to open and close the valve at predetermined times during rotation of the shaft and, therefore, during predetermined points in time during rotation of the rotor.

In a preferred embodiment, the moveable valve comprises one end of a rod or stem, the other end of which is threaded along a portion of its length. A nut is threaded around the threaded end portion of the rod and adjustable moveable along this threaded end portion. Stop means, for example, a fixed shoulder, is positioned adjacent to, but unconnected with the rod at the other end of the latter. An elongated inner compression spring is positioned concentrically around the rod between this stop means and the nut, the spring having one end in engagement with the stop means and its opposite end in engagement with the nut, whereby to apply a predetermined amount of force on the rod in the direction to close the valve. A second compression spring, an elongated outer compression spring, is positioned concentrically around the inner spring and rod between the stop means and nut. This outer spring has one end in engagement with the stop means and its opposite end in engagement with the aforediscussed coupling means. The coupling means is moveable between a first position and a second position. In its first position, the coupling means engages the nut such that the outer spring applies an additional force on the rod via the coupling means and nut, in the direction to close the valve and its second position, the coupling means disengages itself with the nut so as to remove this additional force. From the foregoing and as will be seen in more detail hereinafter, it should be clear and in any event will be made clear that the present invention is directed to a number of improved features in a rotary internal combustion engine. As should become apparent hereinafter, while these features are relatively uncomplicated in design, they do aid substantially to improving the overall operation of the engine in what is believed to be a significant way.

BRIEF DESCRIPTION OF THE DRAWINGS

The following is a brief description of the various figures which illustrate various aspects of the present invention. It is to be understood that many of these features while being illustrated in one or more given figures may not be illustrated in other figures showing similar, adjacent or identical supporting components. This has been done so as to simplify the figures for more readily describing the various aspects of the present invention. In addition, many features which are standard and which could be readily provided by those with ordinary skill in the art have been omitted from the figures, again for purposes of simplicity and to make it easier to describe the various features of the present invention. Accordingly, the brief description of the figures is as follows:

FIG. 1 is a side elevational view illustrating a portion of a rotary internal combustion engine constructed in accordance with the present invention.

FIG. 2 is an end elevational view of the same portion of the engine illustrated in FIG. 1.

FIG. 3 illustrates schematically the general operation of the rotary engine constructed in accordance with the present invention.

FIG. 4 is another schematic illustration of the operation of the engine constructed in accordance with the present invention.

FIG. 5 is an end elevational view of a portion of the engine, illustrating particular features thereof.

FIG. 6 is a vertical sectional view taken generally along line 6—6 in FIG. 5.

FIG. 7 is a side elevational view of a rotor which is constructed in accordance with the present invention and which comprises part of the rotary engine.

FIG. 8A is a perspective view of a main vane mechanism constructed in accordance with the preferred embodiment of the present invention.

FIG. 8B is an exploded view of a portion of the main vane mechanism of FIG. 8A.

FIG. 9 is an enlarged cross-sectional view of a portion of the main vane mechanism of FIG. 8A, illustrating a specific detail thereof.

FIG. 10 is a perspective view of a side vane mechanism which is constructed in accordance with the present invention and which comprises part of the engine.

FIG. 11 both structurally and schematically illustrates a valve mechanism and associated components constructed in accordance with the present invention and also comprising part of the rotary engine.

FIG. 12 is a vertical sectional view of a portion of the valve mechanism of FIG. 11, illustrating a modification thereof.

FIG. 13 is a sectional view illustrating a modified rotary internal combustion engine constructed in accordance with the present invention.

DETAILED DESCRIPTION

Figure 14A:
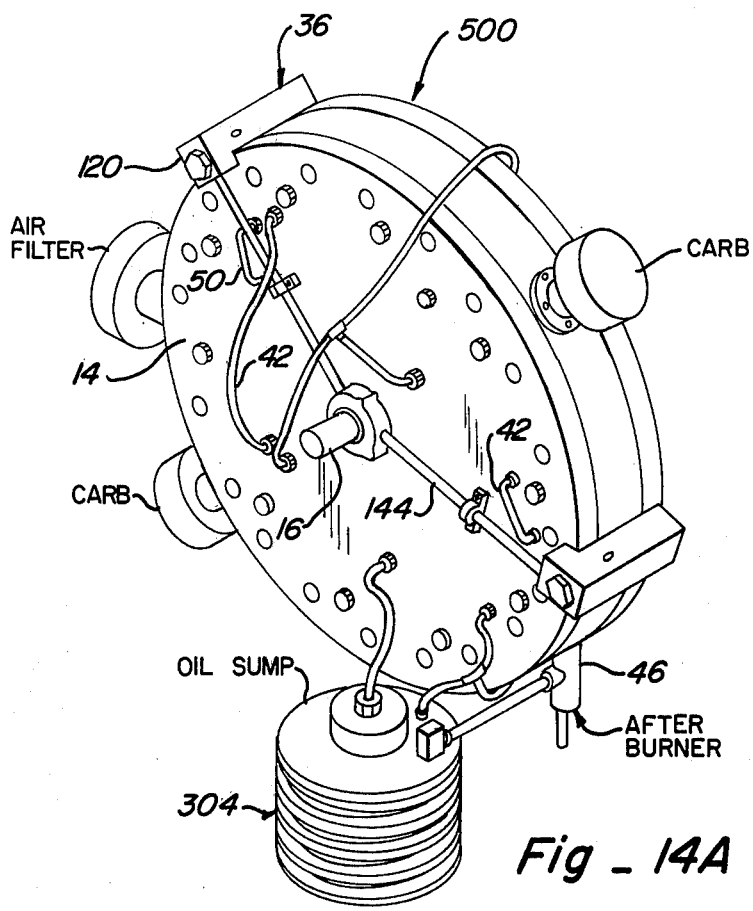
FIGS. 14A and 14B are perspective views of the engine of FIG. 13.

Turning to the drawings, wherein like components are designated by like reference numerals throughout the various figures, a rotary internal combustion engine is illustrated and generally designated by the reference numeral 10. As stated above, this engine includes a number of components which have not been illustrated in the figures. These omitted components are ones which are conventionally or typically provided in a rotary combustion engine, either one in the prior art or in the engine of the present invention. In any event, one with ordinary skill in the art is quite familiar with these conventional or typical components and could readily provide them apart from the present disclosure. Hence, so as not to complicate the present disclosure with unnecessary details, many of these conventional or typical components have been omitted.

Turning specifically to FIGS. 1 and 2, rotary engine 10 is shown including a housing generally designated at 12. This housing is illustrated generally by dotted lines in FIGS. 1 and 2 and would be similar to the housing to be described in FIGS. 14A and 14B. The housing, which is pressurized by conventional means (not shown) includes many conventional components. It also includes two confronting but spaced apart side casings 14 which, as will be seen hereinafter, define therebetween a plurality of function chambers circumferentially spaced about aligned center or rotor support points through the side casings. The rotary engine also includes a shaft 16 located between the side casings and extending through one of these support points to and through the aligned support point. This shaft is mounted conventionally for rotation about its longitudinal axis and supports thereon a rotor generally indicated at 18. The rotor 18 which also comprises part of the rotary engine is located between the side casings and fixed at its center to shaft 16 for rotation therewith.

As illustrated best in FIG. 1, rotor 18 includes a number of radially outwardly extending and circumferentially spaced lobes 20, four in number in the embodiment illustrated in FIGS. 1 and 2. Each lobe 20 defines, in cooperation with the next succeeding lobe, a valley or depression 21. Thus, as will be seen hereinafter, these lobes are movable through the various chambers defined between side casings 14 in the direction of arrow 22 illustrated in FIG. 1. Each lobe 20 includes a backside 24, a frontside 26 and an outer surface 28 extending from the lobe's backside to its frontside. In addition, for reasons to be discussed hereinafter, each lobe preferably includes a radially inward chamfered surface, indicated at 30, which connects the outer surface 28 to front surface 26.

In FIG. 3 the basic operation of rotary engine 10 is illustrated, including many of the components which comprise part of the engine and which cooperate with housing 12 generally and side casings 14 and rotor 18 in particular. As illustrated in this figure, the engine is separated into six function chambers, a first fuel-air chamber, an air-oil chamber, a first combustion chamber, a second fuel-air chamber, a fresh air chamber and a second combustion chamber. The relative positions of these chambers are illustrated in FIG. 3, and the function of each will be discussed below. While the overall engine operation will be discussed in relation to these six chambers, it is to be understood that the engine could include a greater number of these chambers or, in fact, a less number of chambers. For example, the engine could be provided with more than two fuel-air chambers and combustion chambers, it could include more than one air-oil chamber and more than one fresh air chamber and, in fact, it could include just one fuel-air chamber and combustion chamber. In addition, as will be seen in the embodiment illustrated in FIGS. 13, 14A and 14B, fresh air can be provided by the air-oil chamber and the fresh air chamber can be eliminated.

These chambers, which as stated previously are located between side casings 14, are isolated and are actually fluid sealed from one another by means of an outer peripheral portion (not shown) of housing 10 located between and outwardly of casings 14 and a number of main vane mechanisms, specifically six in number, generally indicated at 32. As will be seen hereinafter, each main vane mechanism includes side vanes located on opposite sides of rotor 18 between the rotor and side casings and a cross-vane extending from one side vane to the other across the outer periphery of the rotor. A function chamber is formed by the depression 21, the vanes, and the sides of the casings. As will also be seen hereinafter, the vane mechanisms provide fluid seals between adjacent chambers along the areas between the rotor and side casings.

In addition to these main vane mechanisms, rotary engine 10 includes a number of secondary vane mechanisms indicated at 34. As illustrated in FIG. 3, each chamber includes two secondary vane mechanisms circumferentially spaced from one another and circumferentially spaced from the main vane mechanisms defining the given chamber. As will be seen hereinafter, these secondary vane mechanisms provide a seal along a portion of the sides of lobes 20 and the top surfaces of these lobes as they pass under the secondary vane mechanisms. These secondary vane mechanisms, as will also be seen, include side vanes and cross vanes, similar in many ways to the main vane mechanisms, but the side vanes do not extend as far into the chambers as do the side vanes of the main vane mechanisms, and the secondary vane mechanisms which, as will be seen, reciprocate in a radial fashion.

Turning to the chambers themselves, it is noted that each fuel-air chamber includes a supply of fuel-air, actually a fuel-air mixture associated therewith. This mixture is supplied to its associated fuel-air chamber in metered amounts by means of a suitable metering device (not shown) at an upstream point in the chamber. Note that the upstream point in the first fuel-air chamber is the counterclockwise most point in the chamber. This is because the rotor, which is not shown in FIG. 3, rotates in the clockwise direction. Hence, the term "upstream most point" refers to the point of movement of the rotor as it enters into a given chamber, for example, the first fuel-air chamber, and the term "downstream most point" to be used hereinafter refers to the point of movement of the rotor as it moves out of a given chamber.

In addition to these supplies of fuel and air, engine 10 includes a supply of fresh air and oil which are metered into the air-oil chamber by suitable metering means at an upstream location in the air-oil chamber.

As illustrated in FIG. 3, each of the combustion chambers, i.e., the first combustion chamber and the second combustion chamber, includes an associated fuel intake valve mechanism generally indicated at 36. Each of these combustion chambers also includes what may be referred to as an inner vane mechanism 38 which is spaced below an associated valve mechanism 36 and which extends from a main vane mechanism defining the upstream side of the combustion chamber to the first secondary vane mechanism in the combustion chamber. This main vane mechanism is located upstream of the associated valve mechanism and this secondary vane mechanism is located downstream from the valve mechanism. These two vane mechanisms along with the inner vane mechanism and the fuel entry area, indicated at 40. comprising part of the valve mechanism and the chamfered portions of lobes 20 together define a combustion sub-chamber within the combustion chamber and substantially smaller in area than the overall combustion chamber.

Having described the various chambers illustrated in FIG. 3 and some of the components associated therewith, attention is first directed to the general operation of engine 10 before undertaking a detailed description of the various components just recited. As stated previously, rotor 18 is mounted for rotation in a clockwise direction as viewed in FIG. 3. For this general operational description, it will be assumed that the rotor is, in fact, rotating and the engine is in operation. In this regard, starting up of the engine, that is, starting the rotor to rotate is accomplished by suitable known starting means and will not be discussed herein.

As the rotor is rotating, each lobe passes into and through the various chambers. Taking any given rotor lobe, it can be seen that this lobe passes into, for example, the first fuel-air chamber. Just before this occurs, a conventional mixture of fuel and air having a conventional fuel-air ratio is injected into the first fuel-air chamber. As the lobe passes into and through this chamber, it compresses this mixture and drives it into and through a suitable passage indicated at 42. This passage directs the compressed fuel mixture to the fuel intake valve mechanism 36 which in turn meters a predetermined amount of pressurized mixture into area 40 comprising part of the first combustion sub-chamber at a predetermined point in time relative to the rotation of the rotor. More specifically, as a leading downstream lobe comes into the first combustion chamber and more particularly as the chamfered edge 30 of this lobe comes into the combustion chamber to aid in defining the sub-chamber, the compressed fuel mixture from the first fuel-air chamber is metered into area 40 where it is further compressed by means of the sub-chamber defined by the lobe's chamfered edge, area 40 and the associated vane mechanisms 32, 34 and 38. This further compressed fuel mixture is then fired by suitable firing means, for example, a suitable sparkplug (not shown). As the lobe moves out of the sub-chamber and into the overall combustion chamber, the fuel mixture explodes in the overall chamber producing the force required to further rotate the rotor. The force produced by the explosion is directed in the direction of arrow 33 shown in FIG. 1. The force 33 drives the lagging edge of the downstream lobe at a distance 35 from the center of the rotor 16. Due to the mechanical advantage thus provided, considerable power can be achieved by the present invention.

The residue resulting from fuel combustion in the first combustion chamber is compressed by means of the following lobe as the latter passes into and through the combustion chamber. This compressed residue is passed out of the combustion chamber through a suitable passage indicated at 44 and is directed to a conventional afterburner indicated at 46. The afterburner is conventionally provided for burning the residue, actually any non-combusted fuel in the residue before the latter is passed out into the ambient surroundings.

Operation of the second fuel-air chamber and second combustion chamber is, of course, identical to the operation of the first fuel-air chamber and first combustion chamber and, hence, will not be discussed again. However, like the first combustion chamber, the second combustion chamber is connected to a second passage, indicated at 48, which directs the compressed residue from the second combustion chamber to the afterburner 46.

In addition to the foregoing, any given lobe also passes through the air-oil chamber. However, just before it does so, a predetermined amount of oil mixed with a predetermined ratio of fresh air, for example, one part oil to 20 parts air, is metered into the chamber. As the lobe passes into and through the air-oil chamber, it compresses this mixture and delivers it through a passage indicated at 50 to a predetermined oil receiving area in the engine, which area will be discussed hereinafter with respect to FIGS. 5 and 6. It should suffice now to state that the oil portion of this mixture is provided for lubricating the main vane mechanisms as the latter reciprocate radially in the manner to be discussed hereinafter. The air portion of this mixture is provided for biasing portions of the main vane mechanisms against the moving rotor, again in a manner to be discussed hereinafter. This air may also be used in the afterburner as will be seen with respect to FIGS. 13 and 14A and 14B.

In addition to the foregoing, any given lobe as it rotates passes through the fresh air chamber which does not, in fact, receive any external mixture. Rather, as the lobe passes into and through the fresh air chamber, it compresses the air within the chamber and directs this compressed air to afterburner 46 via passage 52. This compressed air, of course, aids in burning the residue from the combustion chambers and in accordance with the present invention is supplied by means of rotary engine 10 without the necessity of using a separate air supply.

FIG. 4 is a view similar to that of FIG. 3, however, illustrating rotor 18 in relation to the various chambers and vane mechanisms. Note that the rotor, as previously stated, rotates in a clockwise direction so that the frontsides 26 and chamfered edges 30 of the rotor lobes move in front of the backsides 24 of associated lobes. Also, note that the outer surfaces 28 of the rotor lobes move along a predetermined circle which, while not shown, is located concentrically inwardly of a cylindrical portion of housing 12 positioned across and around the outer periphery of side casings 14. Also, note from FIG. 4 that chamfered edges 30 of each lobe 20 eventually move into one of the combustion chambers directly under fuel intake valve mechanism 36. As each chamfered edge does so, its downstream end engages against the nearest downstream secondary vane mechanism while its upstream end engages against the main vane mechanism defining the upstream side of the combustion chamber. At the same time, the sides of the lobe directly under the chamfered edge, that is radially inwardly of the chamfered edge, engage against associated inner vane mechanism 38. This relationship along with the inlet area 40 of valve mechanism 36 provide at least momentarily the previously described combustion sub-chamber. Obviously, as the lobe moves past the valve mechanism further into the overall combustion chamber, this combustion sub-chamber no longer exists. However, it does exist a sufficient amount of time to further compress the already previously compressed fuel-air mixture from the associated fuel-air chamber. This, as stated, is of great advantage in that it provides for more efficient firing of the mixture, and it also results in improved combustion forces for driving rotor 18.

As illustrated in FIGS. 5 and 6, each side casing 14 includes in its confronting face a pair of radially spaced apart and concentric grooves concentrically around and spaced radially outwardly from shaft 16. Each pair of grooves in the confronting face of each side casing has therein a pair of concentric, annular sealing rings which protrude a slight distance out from their associated confronting face and which are constructed of suitable material so as to function in a way to be discussed directly below. Each pair of seals, comprising an outer sealing ring designated at 60 and an inner sealing ring designated at 62, engage against a confronting side of rotor 18 as the latter rotates with shaft 16. These two pair of concentric sealing rings define what will be referred to as two lubricant or oil receiving areas, one of which is illustrated in FIG. 6, generally designated by the reference numeral 64. These lubricant receiving areas are located on opposite sides of rotor 18 between the latter and side casings 14 radially outwardly of shaft 16 and radially inward of the outer periphery of rotor 18 and side casings 14. Sealing rings 60 and sealing rings 62 provide liquid seals around these areas for isolating them from the remaining components of rotary engine 10 with the exception of certain components to be discussed below.

As stated previously, fresh air and metered oil is injected into the air-oil chamber (see FIG. 3) where this mixture is compressed. The compressed mixture, as also stated, is directed via passage 50 (indicated in both FIGS. 3 and 6) into both of the lubricant or oil receiving areas 64 on opposite sides of the rotor. As will be seen hereinafter, much of the oil received in areas 64 is used in lubricating main vane mechanisms 32 with the residue or remainder being directed to other components of the rotary engine as the oil bleeds out through the engine. As will also be seen, the air portion of this mixture received in areas 64 is used to bias portions of the main vane mechanism against the rotating rotor.

In order to aid in supporting the main vane mechanisms 32 in a manner to be described, each of the confronting surfaces of side casings 14 includes a number of grooves or channels, equal in number to the number of main vane mechanisms. While each confronting face actually includes six such grooves or channels FIG. 6, for purposes of simplicity, only shows two grooves or channels 66. An equal number of these channels or grooves is provided on the other confronting face, that is, on the other side casing, such that the grooves or channels 66 in one confronting face are in alignment with the grooves or channels in the other confronting face. As seen in FIG. 6, these grooves extend radially inward from the outer periphery of their associated side casing and terminate radially inward of outer sealing ring 60 and radially outward of inner sealing ring 62. In other words, the grooves terminate in lubricant receiving areas 64. Note particularly from FIG. 5, that grooves 66 do not extend as far into their associated side casings as do the grooves which support outer sealing rings 60. In fact, as clearly illustrated in FIG. 5, the grooves 66 are not nearly as deep as the outer sealing rings themselves. The reason for this will be discussed hereinafter. However, it should further be noted that the sealing rings 60 include notches indicated at 68 in FIG. 6. These notches correspond to the points where the sealing rings cross grooves 66 so as to provide a continuous extension of the grooves as the latter pass across the outer sealing rings.

In addition to grooves 66, the confronting surfaces of side casings 14 include secondary grooves 70, only one of which is shown in FIG. 6. These secondary grooves, equal in number to the number of secondary vane mechanisms 34, confront one another in the same manner as grooves 66. As will be seen hereinafter, these secondary grooves are provided for supporting secondary vane mechanisms 34 and, hence, are located circumferentially around the confronting faces of the side casings in positions corresponding to the secondary vane mechanisms illustrated in FIG. 3. These secondary grooves extend radially inward from the outer periphery of the side casings, but unlike grooves 66 they terminate radially outwardly of outer sealing ring 60.

In addition to grooves 66 and 70, each confronting face of each side casing 14 includes a cross-groove 72 associated with each previously discussed inner vane mechanism 38. Hence, while only one such groove is illustrated in FIG. 6, in accordance with the embodiment illustrated in FIG. 3, two such grooves would be provided in each confronting face. As seen in FIG. 6, each cross-groove 72 is located radially inwardly of the outer periphery of its associated side casing, actually radially inwardly of an associated valve mechanism 36. This groove extends crosswise from one of the main vane mechanism grooves 66, actually the groove associated with the main vane mechanism defining the upstream side of one of the combustion chambers, to the next adjacent secondary groove 70, actually the groove associated with the first secondary vane mechanism in the combustion chamber. The manner in which all of these grooves cooperate to support the main vane mechanism, the secondary main vane mechanisms and the cross-vane mechanisms will be discussed below.

Turning specifically to FIGS. 8A, 8B and 9 attention is directed to the preferred main vane mechanism, generally designated by the reference numeral 32. Mechanism 32 includes opposite side vanes designated at 204, a cross vane designated at 206 and a leaf spring 208. As illustrated best in FIG. 8B, each side vane 32 is comprised of an inner longitudinally extending part 210 and outer longitudinally extending part 212. Part 210 includes a lower segment 214, having the rotor engaging surface 211, constructed of, for example porcelain, and an upper segment 216. For reasons to be described below, segment 216 is smaller in cross-section than segment 214 and is approximately equal in length to cross vane 206. Also for reasons to follow, segment 216 includes a top enlarged spacer segment 218. Part 212 includes a main, longitudinally extending segment 220, a top transverse segment 222 and a bottom transverse cam element 224.

From FIG. 8A and FIG. 8B it can be seen that parts 210 and 212 fit together such that segments 214 and 216 fit in against segment 220 and such that top segment 222 fits over spacer segment 218 and bottom cam element 224 extends under and beyond the bottom end of rotor engaging segment 214. The bottom ends of segment 220 includes inwardly directed and confronting protrusions or actually cam elements 224 since, as will be described hereinafter, these protrusions act as cam elements in radially reciprocating the entire vane mechanism.

It can also be seen from FIG. 8A that the two side vanes 204 are positioned against and on opposite sides of cross vane 206 by means of a spring 226 connected at opposite ends to segments 222. Of course, the segments 220 would be located in previously described grooves 66 (FIG. 6). Each of the segments 220 includes a longitudinally extending oil and air receiving slot 228 shown in FIG. 9. The surfaces of side vanes 220 opposite the confronting faces 221 include grooves, indicated at 223. These grooves 223 extend the entire length of side vanes 220 and, as will be discussed hereinafter, provide receiving areas for compressed air from the air-oil chamber for biasing the side vanes toward one another.

The inner surfaces 211 of side vanes 204 are biased inwardly in the direction of arrows 230 in FIG. 8A, i.e., against the sides of the rotor, by means of the air and oil in slots 228. In this regard, spaces designated at 232 are provided between cross vane 206 and segments 220 of the side vanes. Moreover, segments 216 fit within side slots 234 in cross vane 206. However, the side slots are slightly deeper than segments 216. In this manner, the side vanes are able to move in the directions of arrows 230 relative to the cross vane. There are also spaces provided between segment 210 and the top ends of segments 224, as indicated at 236 in FIG. 8A. These spaces and leaf spring 208 which is held under segments 222 and against the cross vane bias the cross vane in the direction of arrow 238, i.e., against the top of the rotor. This is of great advantage since the seal engaging surfaces 211 of the side vanes are subject to wear as the rotor passes against them, even though these surfaces, actually the entire side vanes are constructed of, for example, ceramic or metal material. As will be seen hereinafter, as these surfaces 211 wear, the force of compressed air in slots 228 continuously bias surfaces 211 into engagement with the side surfaces of the rotor. Like seal engaging surfaces 211, surface 207 of cross vane of 206 is also subject to wear even though the cross vane is constructed, for example, of ceramic or metal material. Hence, as the surface 207 does wear, the entire cross vane 206 is continuously biased into engagement with the outer periphery of the rotor by means of leaf spring 208.

Returning to FIGS. 5 and 6, it can be seen particularly in FIG. 5 that the backsides of side vanes 220 are disposed within the pair of aligned grooves 66 in the confronting faces of side casings 14. As will be seen below, these side vanes are movable in a reciprocal fashion in grooves 66 for reciprocally moving in a radial direction the entire vane mechanism. As shown in FIG. 5, with side vanes 220 in grooves 66, seal engaging surfaces 211 of the side vanes engage against opposite sides of rotor 18 while both the cross vane 206 and cross member extend across and outwardly of the outer periphery of the rotor. With the cross vane in this position its engaging surface 207 is located directly against the outer periphery of the rotor.

As stated previously, the grooves 66 extend into lubricant receiving area 64 radially inward of outer sealing rings 60. As illustrated in FIG. 5, the side vanes are not interrupted by these outer sealing rings, but rather extend continuously past the sealing rings through previously discussed gaps or notches 68 in the rings.

As also seen best in FIG. 5, with vane mechanism 32 located in the manner illustrated, cam elements 224 project into rotor 18. Actually, each of these cam elements project into an associated cam groove 110, which cam groove is located in the confronting surface of rotor 18. One such cam groove is illustrated in FIG. 7. However, an identical cam groove is located on the opposite side of the rotor and in direct alignment with the cam groove illustrated. As seen in FIG. 7, these cam grooves are similar in shape to the outer periphery of rotor 18. Hence, as the rotor rotates, the cam elements 224 ride within rotating groove 110 thereby causing the entire vane mechanism to reciprocate radially in synchronism with the rotor such that cross vane 206, actually its engaging surface 207, continuously engages against the outer periphery of the rotor.

This reciprocating motion of vane mechanisms 32 take place within grooves 66. Obviously, it is desirable to maintain these relative moving parts lubricated, i.e., within both grooves 66 and cam grooves 110. This is accomplished, as stated previously, by providing the compressed air-oil mixture in lubricant receiving areas 228. As the rotor rotates, this compressed air-oil mixture, at least a large portion thereof, moves into and up grooves 66 and into and around cam grooves 110. A surplus of oil or lubricant generally exists and overflows or bleeds into other areas in the engine. As will be seen hereinafter, this surplus ultimately bleeds out of the engine and is collected in an oil sump and reused. In addition to the compressed air-oil mixture moving in this manner, it also moves up behind the side vanes 34 in grooves or recesses 92 so as to bias the side vanes towards one another, that is, against the sides of rotor 18.

From the foregoing, it should be quite clear that main vane mechanisms 32 provide seals between the side surfaces of rotor 18 and the confronting faces of side casings 14 and also against the outer periphery of the rotor. It should be equally clear that the outer periphery of the rotor is continuously engaged by the cross vane comprising part of the overall main vane mechanisms regardless of the irregular shape of the rotor's outer periphery. It should further be apparent that even though the side vanes and cross vanes are subject to wear over prolonged rotary engine operation, these vanes will maintain themselves in engagement with the rotor for periods of time much longer than would be the case if these vanes were not movable in the manner discussed with respect to FIGS. 8 and 9.

Secondary vane mechanisms 34, one of which is illustrated generally in FIG. 5, are substantially identical to main vane mechanisms 32 with three exceptions. The secondary vane mechanisms, like the main vane mechanisms, may include side vanes, a cross vane, a cross member and a leaf spring for biasing the cross vane radially inwardly. However, the side vanes of the secondary vane mechanisms are not as long as the side vanes of the main vane mechanisms and do not include cam elements at their bottom ends. In addition, the leaf spring associated with the secondary vane mechanism biases its associated cross vane in a maximum radially inward position. The side vanes of the secondary vane mechanism are positioned within aligned grooves 70 in the confronting faces of side casings 14 such that the confronting faces of the side vanes engage against the side of rotor 18. Note, however, that the side vanes 70 do not extend beyond outer sealing rings 60, but rather terminate radially outwardly thereof. In addition, the side vanes, rather than being biased into engagement with the side surfaces of the rotor by means of compressed air and oil are biased by means of, for example, leaf springs (not shown) which are located in grooves 70 between the side vanes and grooves. In addition, the cross vanes of the secondary vane mechanism do not continously engage the outer periphery of the rotor, but rather remain relatively fixed so as to engage only the outer surface 28 of lobes 20 including chamfered edges 30. In this regard, as the lobes pass under the cross vanes of the secondary vane mechanisms, the cross vanes do have a tendency to ride up the chamfered edges and along the outer surfaces of the lobes due to the resiliency of the leaf spring between the cross vane and associated cross member. In this regard, the cross vane of the secondary vane mechanism is positioned at its lower most extent within associated grooves in the side vanes. Note that this is necessary because the cross vanes, as well as the side vanes of the secondary vane mechanisms, are not in continuous engagement with the rotor. For example, when a given secondary vane mechanism is positioned between two adjacent rotor lobes as the rotor rotates, the cross vane and a top portion of each side vane is actually out of engagement with the entire rotor.

The inner vane mechanisms 38 which as previously discussed aid in defining the various combustion subchambers, are shown in FIG. 10 comprised of two straight vanes 90 located on opposite sides of the rotor and positioned in previously discussed cross grooves 72 (see FIG. 6). These cross vanes are biased into engagement with opposite sides of the rotor by suitable means, for example, leaf springs 92 located within grooves 72.

Turning to FIG. 11, attention is directed to fuel intake valve mechanism 36. As illustrated in this figure, the valve mechanism includes a housing 120 which is also illustrated in FIG. 4 by means of dotted lines. Housing 120 is located directly outwardly of the outer periphery of rotor 18 between side casings 14, actually between extensions of the side casings indicated at 14a. As illustrated in FIG. 11, the housing defines a number of compartments or openings, including previously discussed fuel outlet area 40 located at the bottom or radially inward end of the housing facing towards the rotor. The housing also includes a fuel intake compartment 122 located adjacent to and outwardly of compartment 40 and an outer compartment 124 located radially outward of compartment 122 and in communication with compartment 122 by means of a narrow passage 126.

Valve mechanism 36 also includes a valve 128 which in the embodiment shown in FIG. 11 comprises the enlarged end of a valve stem 130, the opposite end of which is threaded at 132. As seen in FIG. 11, valve 128, the enlarged end of stem 130, is shown in a position between fuel outlet combustion chamber 40 and fuel inlet compartment 122. In this position, the valve seals compartment 122 from compartment 40. As also seen in this figure, the valve stem extends radially outward through narrow passage 126 and into compartment 124. As will be seen hereinafter, the valve and valve stem are movable between the position shown and a radially inward position, as indicated by two-way arrow 134. In its radially inward position, the valve opens communication between compartment 122 and compartment 40 for passage of fuel from the fuel inlet combustion chamber to the fuel outlet compartment.

As also seen in FIG. 11, valve mechanism 36 includes a nut 135 or other suitable means threaded or otherwise positioned around the threaded portion 132 of stem 130 and two compression springs, an inner compression spring 136 and an outer compression spring 138. Inner compression spring 136 is positioned concentrically around the stem portion within compartment 124 and has its lower or radially inward end abut compartment 124, this bottom end being indicated at 140 and acting as a stop for the compression spring. The top or radially outward end of inner spring 136 engages against nut 135. In a similar fashion, outer compression spring 138 is positioned concentrically around the stem portion located in compartment 124, around inner spring 136. The outer compression spring has its bottom or radially inward end in abutting engagement with stop surface 140. However, its top of radially or outward end engages nut 135 only indirectly, as will be discussed below.

In addition to the components just discussed, value mechanism 36 includes an arrangement 142 for coupling valve 128 with shaft 16 so that the valve opens and closes the passage between fuel intake compartment 122 and fuel outlet compartment 40 in a synchronized fashion to be discussed hereinafter. This arrangement includes a relatively rigid rod 144 which is supported by suitable means (not shown) for reciprocating movement indicated by two-way arrow 146. In this regard, one end of rod 144, its bottom end as illustrated in FIG. 10, is positioned adjacent to but slightly spaced from shaft 16. Between this end of the rod and the shaft there are located a number of cam members, indicated at 148 which are connected with and circumferentially spaced around the shaft. These cam members are dimensioned relative to the spacing between the bottom end of rod 144 and shaft 16 so as to intermittently engage against the rod as the shaft rotates so as to cause the rod to reciprocate in the direction of arrow 146. As will be seen hereinafter, the number of cam members depends upon the number of times valve 128 is required to open and close the passage between compartments 122 and 40 during one rotation of the shaft, actually during one rotation of rotor 18. This, in turn, depends upon the number of times it is desirable to fire the fuel within the combustion chambers for each rotation of the rotor. In the embodiment illustrated, rotor 18 includes four lobes. Since it is desirable in this embodiment to provide combustion as each lobe passes into a combustion chamber, the valve is required to open and close four times per cycle and, hence, four cam elements are shown in FIG. 11.

As also illustrated in FIG. 11, the top or radially outward end of rod 142 is spaced a substantial distance from shaft 16, actually to one side of compartment 124 within housing 120. A second relatively rigid rod 150 is pivotally connected at one end to the top end of rod 144, as indicated at 152. Rod 150 extends through a suitable opening in one of the side casing extensions 14a, the passage being indicated at 154 and through an aligned passage, indicated at 156, in housing 120 so that the free end of the rod is located within compartment 124. This free end includes connected therewith, preferably integrally so, a fork element, indicated at 158. Fork element 158 is positioned around stem 130 between nut 135 and the top end of outer compression spring 138. Note that the fork element is sufficiently wide so that inner compression spring 136 extends between the prongs of the fork element and in direct engagement with nut 135 without engaging the fork element. With rod 144 in the position illustrated, that is, with its bottom end in direct engagement with shaft 16 as opposed to cam members 148, rod 150 is in a relatively horizontal position such that both the fork element 158 and outer compression spring 138 engage against nut 135. However, as rod 144 rides up one of the cam members it causes rod 150 to pivot in the direction of arrow 160 which in turn causes fork element 158 to move downward in the direction of arrow 162 and out of engagement with nut 135. This, in turn, causes the rotor compression spring 138 to also move out of engagement with nut 135.

Having described the preferred construction of valve mechanism 36, attention is now directed to the manner in which it operates to inject a compressed mixture of fuel and air from one of the fuel-air chambers, for example, the first fuel-air chamber. As stated previously, this mixture is first compressed in the fuel-air chamber and delivered to the valve mechanism via passage 42. Actually, as illustrated in FIG. 11, it is delivered to inlet chamber 122 via passage 42 and a narrower passage 42a in housing 120. A check valve, indicated generally at 164, may be provided in passage 42. The compressed fuel enters into chamber 122 and because of its compressed state exerts a downward or radially inward force against valve 128 which initially is in its closed position. This force by itself is not sufficient to force valve 128 and its stem 130 downward to open the passage due to the counter forces exerted by inner compression spring 146 and outer compression spring 138 against nut 135. However, cam elements 148 on shaft 16 are positioned so that as one of the lobes on rotor 18 passes into one of the combustion chambers, for example, the first combustion chamber and is in the position as to aid in defining the associated previously discussed sub-chamber, one of the cam elements 148 causes rod 144 to move upwards. This, in turn, causes the connected end of rod 150 to pivot in the direction of arrow 160 thereby causing fork element 158 to move downwards in the direction of arrow 162. This, in turn, forces the outer compression spring 138 out of engagement with nut 135 and, hence, takes the counter force of this compression spring off of nut 135. Accordingly, the only force acting upwards countering the downward force of compressed fuel within chamber 122 is the force of inner compression spring 136. Nut 135 is appropriately positioned along threaded portion 132 of stem 130 so that this force is not sufficient to maintain the valve closed. Hence, once the outer compression spring 138 is disengaged from nut 135, the valve opens and the compressed fuel within compartment 122 escapes into compartment 40.

Obviously, the amount of force actually exerted on valve 128 to open the latter depends upon the pressure within chamber 122 exerted by the compressed fuel mixture. Since this may vary depending on many factors including, for example, the particular fuel mixture used and the degree to which it is compressed, nut 135 may be adjusted so that the force in compartment 122 to open the valve is always greater than the counter force of spring 136. As illustrated in FIG. 11, to reduce the upward force provided by spring 136, the nut is threaded upwards, and to increase the force exerted by spring 136, the nut is moved downward. In this regard, as the nut moves up or down threaded portion 132, fork element 158 also moves with the nut so as to remain in engagement therewith when rod 144 is out of engagement with cam members 148. Obviously, passages 154 and 156 must compensate for this movement.

As illustrated back in FIG. 3, engine 10 includes two combustion chambers, and hence, two fuel intake mechanisms. Only one of these mechanisms has been described in FIG. 11. However, the other valve mechanism would be substantially identical. In addition, where more than one valve mechanism is used, for example, where two such mechanisms are required they could as in the present case be operated by the same set of cam elements and positioned relative to these cam elements so as to open and close at predetermined times relative to one another and more important relative to the rotation of rotor 18.

Having described the various pertinent components comprising rotary engine 10 and the manner in which these components function both alone and together, the overall operation of the engine should be quite clear. However, this overall operation will be briefly summarized. For this brief summary, attention is first redirected to FIGS. 3, 4 and 5. In starting engine 10, the rotor 18 is initially rotated by a suitable force other than combustion within the engine. Known means (not shown) may accomplish this by, for example, apply a rotational force to shaft 16. Ultimately, rotation of the rotor is accomplished solely by combustion within the engine. As the rotor rotates, rotating shaft 16, the various lobes 20 pass into and through the various chambers illustrated in FIG. 3.

To assure that these chambers are sealed from one another so as to function in the manner described above, the side vanes 220 (see FIG. 8) of main vane mechanisms 32 remain in continuous sealing engagement with the sides of lobes 20, at least down to the outer sealing rings 60 (see FIG. 6) and slightly beyond these rings. In addition, the cross vanes 206 (also see FIG. 8) of the main vane mechanisms remain in continuous engagement with the outer periphery of the rotor even though the outer periphery is quite irregular. This, as described, is accomplished by reciprocally moving the main vane mechanisms in synchronism with movement of the outer periphery of the rotor. Accordingly, both the top and side surfaces of the rotor between any two adjacent compartments are in continuous sealed engagement with a main vane mechanism and, hence, these adjacent compartments are substantially sealed from one another.

As previously stated, both side vanes and the cross vane making up each main vane mechanism is continuously biased against the rotating rotor. The side vanes are biased against the rotor by means of compressed air behind the side vanes, the compressed air being provided by the air-oil chamber, and the cross vane is continuously biased against the outer periphery of the rotor by means of a leaf spring. Accordingly, should the side vanes and cross vanes wear, which they more than likely will, they will nevertheless remain in engagement with the rotor for a substantially longer period of time than would be the case if these vanes were not movable in the direction of the rotor and also biased in this direction.

As the rotor rotates through the individual chambers, the lobes also engage against secondary vanes 34. These vanes act in a similar way as the main vane mechanisms, but do not extend as far as do the main vane mechanisms and do not actually separate the individual chambers into subchambers. Rather, they prevent the mixture being compressed in a given chamber from passing back behind the lobe over the lobes outer surface. As a result, it is not necessary for the secondary vane mechanisms to continuously engage against the rotor, but rather only the top portion of the lobes as the latter pass thereunder.

In actual operation, as one of the lobes passes into the first fuel-air chamber, it compresses the fuel-air mixture therein and, as previously stated, delivers this compressed mixture via passage 40 to the fuel intake valve mechanism 36 associated with the first combustion chamber. This mixture is delivered to the inlet compartment 122 in the valve mechanism (see FIG. 11). At the same time, the downstream lobe, for example, the second lobe downstream, enters into the first combustion chamber, as illustrated in FIG. 4. As this occurs, the chamfered edge 30 associated with this lobe cooperates with the adjacent main vane mechanism and side vane mechanism and with inner vane mechanism 38 and outlet chamber 40 of valve mechanism 36 to define the previously described combustion sub-chamber within the first combustion chamber. At this time, one of the cam elements 148 engages against rod 144 (see FIG. 11) to ultimately open valve 128 so that the compressed fuel mixture from the first fuel-air chamber enters into chamber 40 and actually into the combustion sub-chamber where it is further compressed by the moving lobe in the first combustion chamber. This further compressed mixture is fired, that is, ignited, and explodes behind the lobe in the combustion chamber so as to further rotate the rotor with great force due to the mechanical advantage previously discussed. This overall procedure preferably takes place simultaneously in both the first fuel-air chamber and second fuel-air chamber and first and second combustion chambers.

After the fuel in the combustion chamber is ignited and explodes behind a given lobe, the next lobe entering the combustion chamber forces the residue in this previous combustion into afterburner 46 via passage 48. At approximately the same time, the downstream lobe passes into and through the fresh air chamber so as to compress the air therein and deliver it to the afterburner via passage 52. This compressed fresh air is mixed with the combustion residue so that the latter burns more fully. Where both combustion chambers are firing at the same time, the residue from both of these chambers are preferably delivered to the afterburner at the same time, and the compressed fresh air is preferably also delivered at the same time. Obviously, the use of the fresh air chamber eliminates the use of externally supplied compressed air in the afterburner independent of engine 10 which itself is obviously an advantage. However, in addition, this eliminates either the requirement of continuously supplying fresh air to the afterburner or in lieu thereof coupling means to synchronize supplying fresh air from an external source to the afterburner the same time that the combustion residue is supplied thereto.

From the foregoing, it should be quite clear that the rotary internal combustion in accordance with the present invention includes many features which improve overall operation of the engine. For the most part, only the essential components of the rotary engine have been described, along with the components making up these features. It is to be understood that those components of a rotary engine which have not been described are components which are known in the art and which could readily be supplied with those skilled in the art.

Engine 10, as described, may include several advantages in addition to those described above. For example, many of the components including the housing, the various vane mechanisms and the rotor can be constructed of a porcelain or metal material. This type of material does not have a tendency to expand upon heating up and, hence, the component constructed of this type of material can be designed with small tolerances. In addition, the rotary engine of the present invention is especially suitable for use with fuel injection. More specifically, compressed fuel can be injected from an external source directly into previously described area 40 (see FIG. 11). This is indicated by dotted arrow 200 in FIG. 11. Of course, suitable means could readily be provided for injecting this compressed fuel into area 40 at the appropriate time. Where fuel injection is provided, fuel would, of course, not be supplied into the previously described fuel-air chamber. Only air would be provided into this chamber.

Still another advantage to engine 10 resides in the fact that it can use but does not necessarily require more than one combustion chamber. More specifically, where two or more combustion chambers are provided, suitable means (not shown) can be used to by-pass some of the chambers. In other words, where little power is required, all but one of the combustion chambers can be made inoperative, thereby reducing fuel comsumption.

Having described engine 10, its operation and components and its advantages, attention is now directed to further and preferred embodiments of certain components making up the engine. As will be seen below, these include a slightly modified and preferred fuel intake valve and a particular arrangement associated with the engine's lubrication and compressed air system.

Turning to FIG. 12 attention is directed to a slight modification to previously described intake valve mechanism 36 (FIG. 11). The modified mechanism which is preferred is designated by the reference numeral 240 in FIG. 12. This modified mechanism is identical to mechanism 36 with one exception. Rather than using cross member 150 and forked end 58 (FIG. 11) engaging against washer 159, the cross member of mechanism 240, designated at 242, engages against a top cap 244 which is positioned over and against a washer 246 (corresponding to a washer 159 which could be located between fork end 158 and outer spring 138 in FIG. 11).

When member 242 is moved in the direction of arrows 248 (in the same manner as member 150), the cap moves down in the direction of arrows 250. This disengages washer 246 and previously described spring 138 from previously described nut 135 and spring 136. Apart from this slight variation in the manner in which the washer 246 and outer spring are disengaged from nut 135, operation of mechanism 240 is identical to mechanism 36.

Figure 14B:
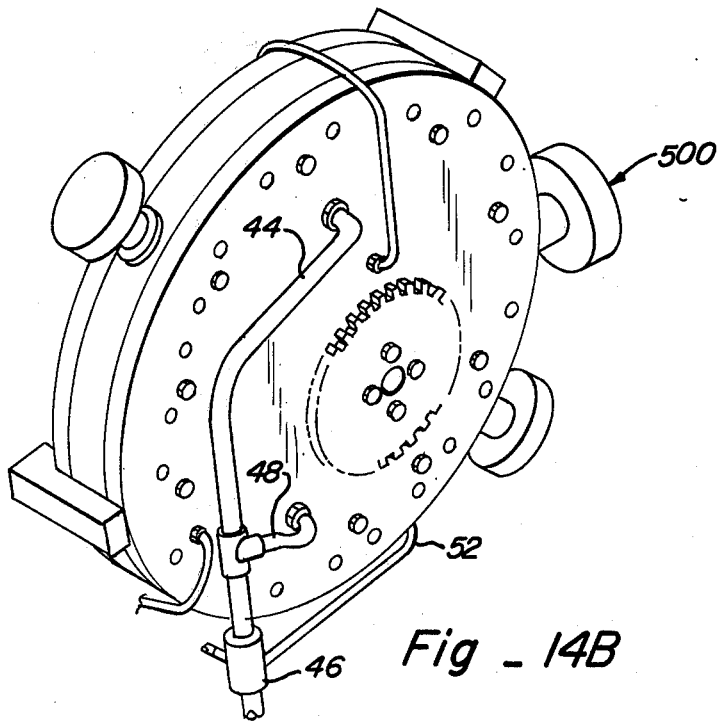

Turning to FIGS. 13 and 14A and 14B, attention is directed to an engine 500 which is identical to engine 10, with certain exceptions to be discussed below. Those components in engine 500 which are identical to engine 10 are designated by the same reference numerals. Hence, engine 500 includes a housing 12, side casings 14, fuel-air mixture sources (generally designated at 300 in FIGS. 13, 14A and 14B) which are actually carburators, main vane mechanisms 32, secondary vane mechanism 34, and so on. These components are shown as they actually exist as compared to the somewhat schematic illustrations in the various figures in engine 10.

Engine 500, however, includes a three lobed rotor 302 and, for reasons to be discussed hereinafter, it does not include a fresh air chamber. In addition, each of the carburators may include an air filter and, in fact, the source of air and oil may also include one.

Engine 500 and engine 10 include an oil sump arrangement 304 which acts to provide a closed system for lubrication to engine 500. For purposes of simplicity, arrangement 304 is only shown with engine 500. As will be discussed below, this arrangement delivers oil to the previously described air-oil chamber (FIG. 3) and receives the same oil after it has passed into and bled out of the engine. In this regard, as will be seen, the sump arrangement is kept under pressure, for example 40 psi, to pump the oil back into the system.

As stated with regard to engine 10, an air-oil chamber (FIG. 3) receives a mixture of air and oil. This mixture is compressed and delivered via conduit 50 to the oil receiving area 64 (FIG. 6). This would also be the case with engine 500. As stated, the oil lubricates the various components of the engine (either 500 or 10) including the main vane rotor shaft and so on. The air, as stated aids in biasing the side vanes of the main vane mechanism.

Both the oil and air eventually bleed off into bleedoff collecting grooves 306 illustrated in FIG. 6 (engine 10) and FIG. 13 (engine 500). There are two such grooves, one in each inward face of side casings 14. As can be seen, these grooves, circumscribe the outer periphery of the vane mechanisms. Once collected in the collecting grooves 306, the oil and air drain into the sump arrangement via conduit 308. The pressure in this line is maintained at a predetermined level, for example 40 psi by suitable means such as a relief valve (not shown).

The oil entering the sump arrangement is condensed and filtered by suitable means (not shown). It then passes to the bottom of the arrangement where by the 40 psi pressure it is recirculated through the engine again. Obviously, this oil will have to be periodically changed or replenished.

As stated above, the compressed air also bleeds off into the sump arrangement. Any excess air, above 40 psi, may be allowed to bleed to the atmosphere. However, in accordance with a preferred embodiment of both engines 10 and 500, this excess air is delivered to the afterburner via for example a relief valve to accomplish the same purpose described with respect to the air from the fresh air chamber in engine 10 (FIG. 3), i.e., to aid in burning the residue in the afterburner. While the previously described fresh air chamber (FIG. 3) could be used in conjunction with the air from sump arrangement 304, the two approaches can be used alternatively.

It is to be understood that the various features discussed with respect to engine 500 can be incorporated in engine 10. By the same token, the various features in engine 10 could be incorporated in engine 500. For example, the lobes in the rotor of engine 10 are shown to include chamfered edges 30 which aid in providing the previously described combustion sub-chamber (FIG. 3). It is to be understood that this sub-chamber including the various vane mechanisms and chamfered lobes could be provided with engine 500. By the same token, engine 500 could be provided without the sub-chamber and hence without the chamfered edges 30. In addition, each engine could be provided with either of the described embodiments of the vane mechanisms and intake valve mechanism.

I claim:

1. A rotary internal combustion engine comprising:
   a. a housing including two confronting but spaced apart side casings having respective rotor support points in alignment with one another, said casings defining therebetween a plurality of chambers circumferentially spaced about said rotor support points, said chambers including
      i. a fuel-air chamber,
      ii. an air-oil chamber,
      iii. an air chamber, and
      iv. a fuel combustion chamber including therein an area for a fuel combustion sub-chamber;
   b. a shaft located between said casings and extending from one of said support points to the other support point, said shaft being mounted for rotation about its longitudinal axis;
   c. a rotor located between said side casings and fixed at its center to said shaft for rotation therewith, said rotor including a plurality of radially outwardly extending, circumferentially spaced lobes moveable through said chambers during rotation of said rotor;
   d. a plurality of main vane mechanisms respectively positioned between said chambers and cooperating with said rotor and side casings for substantially fluid sealing said chambers from one another between said rotor and side casings, each of said mechanisms including
      i. a pair of elongated side vanes located on opposite sides of said rotor and in slidable engagement therewith, said side vanes being mounted for movement towards said rotor, and
      ii. a cross vane extending between and connected with said side vanes across the outer periphery of said rotor and moveable toward said outer periphery, and
      iii. means for biasing said cross vane in slidable engagement with said outer periphery;
   e. means for moving said vane mechanisms in a radially directed reciprocal fashion in synchronism with the rotation of said rotor so as to maintain said cross vanes in slidable engagement with the outer periphery of said rotor substantially continuously throughout the rotation of said rotor, said moving means including
      i. a pair of substantially identical cam grooves located in opposite sides of said rotor in alignment with one another, said grooves being located inwardly of the outer periphery of said rotor and taking substantially the shape of said outer periphery, and
      ii. a pair of side vane support grooves for each of said vane mechanisms, the side grooves of each pair being respectively located in said casings and facing said rotor, said side grooves extending radially outwardly from points adjacent said cam grooves to points adjacent the outer periphery of said rotor;
   f. the side vanes of each vane mechanism being respectively located in a pair of said side grooves for radial movement therein, said side vanes including cam means located in said cam grooves so that during rotation of said rotor the interaction between said cam grooves and cam means causes said vane mechanisms to reciprocate radially in synchronism with said rotor to maintain said cross vane in engagement with the outer periphery of said rotor;
   g. two pairs of sealing rings respectively located on opposite sides of said rotor between said rotor and said side casings and in sealing engagement with said rotor and casings, each pair of rings being comprised of an inner sealing ring located concentrically around said shaft radially inwardly of said cam grooves and an outer sealing ring located concentrically around said inner ring radially outwardly of said cam grooves, each pair of rings defining a circumferential oil receiving area therebetween;
h. means for delivering a predetermined mixture of fuel and air to said fuel-air chamber, said rotor, during rotation thereof, compressing said fuel and air mixture as one of the rotor lobes passes through the fuel-air chamber;
i. means for delivering said compressed mixture of fuel and air from said fuel-air chamber to said area in said combustion chamber, said last-mentioned means including
  i. a passage extending from said fuel-air chamber to a point adjacent said combustion chamber, and
  ii. a valve mechanism cooperating with said passage for metering a predetermined amount of said compressed mixture of fuel and air to said combustion chamber at predetermined points in time during rotation of said rotor, said valve mechanism including
    a. a valve moveable between an opened position for allowing said compressed mixture to pass into said combustion chamber and a closed position for preventing said compressed mixture from passing to said combustion chamber, and
    b. coupling means connected with said valve and cooperating with said rotating shaft so as to open and close said valve at predetermined times during the rotation of said shaft and said rotor;
j. means including said rotor for further compressing said compressed mixture of fuel and air in said area in said combustion chamber;
k. means for igniting said further compressed mixture within said combustion chamber to combust said mixture at a predetermined time during the rotation of said rotor so as to cause further rotation of said rotor, said combustion chamber cooperating with said compressed fuel-air chamber such that as said rotor rotates, the residue from the combustion of said fuel and air mixture passes into the overall combustion chamber;
l. passage means connected between said combustion chamber and a point outside the engine for directing said residue to said outside point;
m. means for delivering a predetermined mixture of air and oil to said air-oil chamber, said rotor, during rotation thereof, compressing said air and oil mixture as one of the rotor lobes passes through said air-oil chamber;
n. passage means connected between said air-oil chamber and said oil receiving areas defined by said sealing rings for directing said compressed mixture of air and oil from said air-oil chamber to said oil receiving areas, said mixture of air and oil entering said areas and passing up said side groove and into said cam grooves to provide lubrication between said cam means and said rotor and between said side vanes and said casings, said air and oil mixture in said side grooves also biasing said side vanes against said rotor;
o. said air chamber including air therein, said rotor, during rotation thereof, compressing said air as one of the rotor lobes passes through said air chamber; and
p. passage means connected between said air chamber and said outside point for delivering said compressed air from said air chamber to said outside point to mix with said residue.

2. A rotary internal combustion engine according to claim 1 and including:
  a. a secondary vane mechanism located to one side of said valve downstream of the movement of said lobes, said secondary vane mechanism including
    i. a pair of elongated side vanes located on opposite sides of said rotor and in slidable engagement with said rotor and in engagement with said side casings,
    ii. means biasing said secondary side vanes in slidable engagement with said rotor, and
    iii. a cross vane extending between said secondary side vanes at the outer periphery of said lobes so as to slidably engage the outer periphery of said lobes as the latter pass under said secondary cross vane;
  b. a pair of seal means respectively located on opposite sides of said rotor between said rotor and side casings, radially inwardly of said valve and extending from said secondary vane mechanism to a main vane mechanism located to one side of said valve upstream of the rotational movement of said rotor;
  c. said last-mentioned main vane mechanism, said secondary vane mechanism, said pair of seal means, said valve and each of said lobes as it passes under said valve together aiding in defining said subchamber in said area in said combustion chamber.

3. A rotary internal combustion engine according to claim 2 wherein the outer periphery of each of the lobes of said rotor is slightly curved from the backside of the lobe to its front side, each of said lobes including a radially inward chamfered edge at its front side, said chamfered edge aiding in defining said combustion subchamber as said edge passes under said valve.

4. A rotary internal combustion engine according to claim 3 wherein said valve mechanism includes
  a. said valve moveable between said opened and closed positions, said valve comprising one end of a rod, the other end of which is threaded along a portion of its length;
  b. a nut threaded around said threaded end portion of said rod and adjustably moveable along said threaded end portion;
  c. stop means positioned adjacent to but unconnected with said rod between the ends thereof;
  d. an elongated inner compression spring positioned concentrically around said rod between said stop means and said nut, said spring having one end in engagement with said stop means and its opposite end in engagement with said nut whereby to apply a predetermined amount of force on said rod in the direction to close said valve;
  e. an elongated outer compression spring positioned concentrically around said inner spring and said rod between said stop means and said nut, said outer spring having one end in engagement with said stop means and its opposite end in engagement with said coupling means, said coupling means being moveable between a first position and a second position, in said first position, said coupling means engaging said nut such that said outer spring applies an additional force on said rod in the direction to close said valve and in said second position, said coupling means disengages itself with said nut so as to remove said additional force.

5. In a rotary internal combustion engine including a housing having two confronting but spaced apart side casings defining therebetween a plurality of chambers circumferentially spaced about a rotatably mounted shaft extending between said casings and a rotor having a non-circular outer periphery, said rotor being located between said casings and being mounted around said shaft for rotation therewith, the improvement comprising:
   a. a plurality of vane mechanisms respectively positioned between said chambers and cooperating with said rotor, and housing including said side casings for substantially fluid sealing said chambers from one another, each of said vane mechanisms including:
      i. a pair of elongated side vanes located on opposite sides of said rotor, in engagement with said casings and in slidable engagement with said rotor, and
      ii. a cross vane extending between said side vanes across and in engagement with the outer periphery of said rotor and movable in radially directed reciprocal fashion, said cross vane being connected with associated side vanes;
   b. means operatively connected with said cross vanes and said rotor for reciprocally moving said cross vanes during rotation of said rotor in a way which causes said cross vanes to stay in engagement with the outer periphery of said rotor as the latter rotates, said means for reciprocally moving said vanes including:
      i. a pair of substantially identical cam grooves located in opposite sides of said rotor in alignment with one another, said cam grooves being located inwardly of the outer periphery of said rotor and taking substantially the shape of said outer periphery,
      ii. a pair of side vane support grooves for each of said vane mechanisms, the side grooves of each pair being respectively located in said casings and facing said rotor, said side grooves extending radially outwardly from points approximate said cam grooves to points adjacent the outer periphery of said rotor,
      iii. the side vanes of each of said vane mechanisms, each pair of side vanes being respectively located in a pair of side grooves for radial movement therein, and
      iv. cam means connected with said side vanes and disposed within said cam grooves whereby during rotation of said rotor the interaction between said cam grooves and cam means causes said side vanes and said cross vanes to reciprocate radially in synchronism with said rotor to maintain said cross vanes in engagement with the outer periphery of said rotor,
   c. two pairs of sealing rings respectively located on opposite sides of said rotor between said rotor and said side casings and in sealing engagement with said rotor and casings, each pair of sealing rings being comprised of an inner sealing ring located concentrically around said shaft radially inwardly of said cam grooves and an outer sealing ring located concentrically around said inner ring radially outwardly of said cam grooves, each pair of rings defining a circumferential lubricant receiving area therebetween; and
   d. means for delivering a liquid lubricant to said lubricant receiving areas, said delivering means including at least two passages, each of said at least two passages having a portion passing through a respective one of said side casings, each of said portions of said at least two passages being respectively in fluid communication with one of said two lubricant receiving areas at a location between each respective pair of sealing rings and spaced from each sealing ring in said respective pair, said lubricant passing into said cam grooves and said side grooves to lubricate between said cam means and said rotor in said cam grooves and between said side vanes and said casings in said side grooves.

6. In a rotary internal combustion engine including a housing having two confronting but spaced apart side casings defining therebetween a plurality of chambers circumferentially spaced about a rotatably mounted shaft extending between said casings and a rotor having a non-circular outer periphery, said rotor being located between said casings and being mounted around said shaft for rotation therewith, the improvement comprising:
   a. a plurality of vane mechanisms respectively positioned between said chambers and cooperating with said rotor, and housing including said side casings for substantially fluid sealing said chambers from one another, each of said vane mechanisms including:
      i. a pair of elongated side vanes located on opposite sides of said rotor, in engagement with said casings and in slidable engagement with said rotor, and
      ii. a cross vane extending between said side vanes across and in engagement with the outer periphery of said rotor and movable in radially directed reciprocal fashion, said cross vane being connected with associated side vanes;
   b. means operatively connected with said cross vanes and said rotor for reciprocally moving said cross vanes during rotation of said rotor in a way which causes said cross vanes to stay in engagement with the outer periphery of said rotor as the latter rotates, said means for reciprocally moving said vanes including:
      i. a pair of substantially identical cam grooves located in opposite sides of said rotor in alignment with one another, said cam grooves being located inwardly of the outer periphery of said rotor and taking substantially the shape of said outer periphery,
      ii. a pair of side vane support grooves for each of said vane mechanisms, the side grooves of each pair being respectively located in said casings and facing said rotor, said side grooves extending radially outwardly from points approximate said cam rotor,
      iii. the side vanes of each of said vane mechanisms, each pair of side vanes being respectively located in a pair of side grooves for radial movement therein, and
      iv. cam means connected with said side vanes and disposed within said cam grooves whereby during rotation of said rotor the interaction between said cam grooves and cam means causes said side vanes and said cross vanes to reciprocate radially in synchronism with said rotor to maintain said cross vanes in engagement with the outer periphery of said rotor, c. two pairs of sealing rings respectively located on opposite sides of said rotor between said rotor and said side casings and in sealing engagement with said rotor and casings, each pair of sealing rings being comprised of an inner sealing ring located concentrically around said shaft radially inwardly of said cam grooves and an outer sealing ring located concentrically around said inner ring radially outwardly of said cam grooves, each pair of rings defining a circumferential lubricant receiving area therebetween; and d. means for delivering a liquid lubricant to said lubricant receiving areas, said lubricant passing into said cam grooves and said side grooves to lubricate between said cam means and said rotor in said cam grooves and between said side vanes and said casings in said side grooves, said delivering means including:
i. one of said chambers of said rotary engine;
ii. means for delivering lubricant into said one chamber;
iii. means including said rotor for compressing said lubricant within said one chamber; and
iv. means for directing said compressed lubricant to said lubricant receiving areas from said one chamber.

7. The improvement according to claim 6 wherein said means for delivering lubricant to said one chamber simultaneously delivers air mixed with said lubricant, said air also being compressed and directed by said directing means into said lubricant receiving area, said compressed air moving up said side grooves behind said side vanes so as to bias said side vanes against said rotor.

8. In a rotary internal combustion engine including a housing having two confronting but spaced apart side casings defining therebetween a plurality of chambers circumferentially spaced about a rotatably mounted shaft extending between said casings and a rotor having a non-circular outer periphery, said rotor being located between said casings and being mounted around said shaft for rotation therewith, the improvement comprising:

a. a plurality of vane mechanisms respectively positioned between said chambers and cooperating with said rotor, and housing including said side casings for substantially fluid sealing said chambers from one another, each of said mechanisms including
i. a pair of elongated side vanes located on opposite sides of said rotor, in engagement with said casings and in slidable engagement with said rotor,
ii. a cross vane extending between said side vanes across and in engagement with the outer periphery of said rotor and movable in radially directed reciprocal fashion, each of said cross vanes being movable toward the outer periphery of said rotor relative to said side vanes and said side vanes being movable towards the sides of said rotor relative to said cross vanes, and
iii. means for continuously biasing each of said cross vanes in slidable engagement with the outer periphery of said rotor and means for continuously biasing said side vanes in slidable engagement with said rotor, whereby said cross vanes and side vanes remain in engagement with said rotor regardless of wear to said vanes due to their slidable engagement with said rotor, and b. means operatively connected with said cross vanes and said rotor for reciprocally moving said cross vanes during rotation of said rotor in a way which causes said cross vanes to stay in engagement with the outer periphery of said rotor as the latter rotates.

9. In a rotary internal combustion engine including a housing having two confronting but spaced apart side casings defining therebetween a plurality of chambers circumferentially spaced about a rotatably mounted shaft extending between said casings and a rotor located between said casings and mounted around said shaft for rotation therewith, the improvement comprising:

a. a plurality of vane mechanisms respectively positioned between said chambers and cooperating with said rotor and said housing including said side casings for substantially fluid sealing said chambers from one another, each of said mechanisms including
i. a pair of elongated side vanes located on opposite sides of said rotor, in engagement with said casings and in slidable engagement with said rotor, said side vanes being movable towards said rotor, and
ii. a cross vane extending between said side vanes across and in continuous engagement with the outer periphery of said rotor, said cross vane being moveable towards said outer periphery; and b. means biasing each of said side vanes against said rotor and means biasing said cross vanes against said rotor regardless of wear to said vanes due to their slidable engagement with said rotor.

10. The improvement according to claim 9 wherein said cross vanes biasing means includes spring means for each cross vane, each spring means being located in engagement with an associated cross vane and applying force thereto in the radially inward direction.

11. The improvement according in claim 9 wherein said side vanes biasing means includes air under compression between said side vanes and said side casings whereby to force said side vanes against said rotor.

12. A rotary internal combustion engine comprising:

a. a housing including two confronting but spaced apart side casings having respective rotor support points in alignment with one another, said casings defining therebetween a plurality of chambers circumferentially spaced about said rotor support points, said chambers including
i. a fuel-air chamber, and
ii. a combustion chamber;

b. a shaft located between said casings and extending from one of said support points to the other support point, said shaft being mounted for rotation about its longitudinal exis;

c. a rotor located between said side casings and fixed at its center to said shaft for rotation therewith, said rotor including a plurality of radially outwardly extending, circumferentially spaced lobes movable through said chambers during rotation of said rotor, each of said lobes having a back side, a front side, an outer surface extending from said back side towards said front side and a radially inward chamfered surface connecting said outer surface with said front side;

d. a plurality of means respectively substantially fluid sealing said chambers from one another;

e. means for delivering a predetermined mixture of fuel and air to said fuel-air chamber, said rotor, during rotation thereof, compressing said fuel and air mixture as one of the rotor lobes passes through the fuel-air chamber;

f. means for delivering said compressed mixture of fuel and air from said fuel-air chamber to said combustion chamber through an entry area in said combustion chamber;

g. means including one of said fluid sealing means, said entry area and a chamfered edge of one of said lobes as said edge moves into said combustion chamber at a predetermined point relative to said area defining a combustion sub-chamber smaller than but within said combustion chamber for further compressing said compressed mixture, said one fluid sealing means being located adjacent to and upstream of said entry area, said means defining said sub-chamber including second fluid sealing means located adjacent to and downstream of said entry area, said second means extending across and in engagement with the outer periphery of said lobes when said lobes pass under said second means, said second means also extending radially inwardly from said outer periphery between and in engagement with the sides of said rotor and said casings, and third fluid sealing means located on opposite sides of said rotor between and in engagement with said rotor and side casings, said third means extending from said second means to said one fluid sealing means radially inwardly of said entry area, and h. means for igniting said further compressed mixture within said sub-chamber to combust said mixture.

13. A rotary internal combustion engine comprising:

a. a housing including two confronting but spaced apart side casings having respective rotor support points in alignment with one another, said casings defining therebetween a plurality of chambers circumferentially spaced about said rotor support points, said chambers including
   i. a fuel-air chamber, and
   ii. a combustion chamber;

b. a shaft located between said casings and extending from one of said support points to the other support point, said shaft being mounted for rotation about its longitudinal axis;

c. a rotor located between said side casings and fixed at its center to said shaft for rotation therewith, said rotor including a plurality of radially outwardly extending, circumferentially spaced lobes movable through said chambers during rotation of said rotor, each of said lobes having a back side, a front side, an outer surface extending from said back side towards said front side and a radially inward chamfered surface connecting said outer surface with said front side;

d. a plurality of means respectively substantially fluid sealing said chambers from one another;

e. means for delivering a predetermined mixture of fuel and air to said fuel-air chamber, said rotor, during rotation thereof, compressing said fuel and air mixture as one of the rotor lobes passes through the fuel-air chamber;

f. means for delivering said compressed mixture of fuel and air from said fuel-air chamber to said combustion chamber through an entry area in said combustion chamber, said delivery means including a passage extending from said fuel-air chamber to a point adjacent said entry area of said combustion chamber, and a valve mechanism cooperating with said passage for metering a predetermined amount of said compressed mixture of fuel and air to said entry area at predetermined points in time during rotation of said rotor, said valve mechanism including i. a valve movable between an opened position for allowing said compressed mixture to pass into said entry area and a closed position for preventing said compressed mixture from passing into said entry area, said valve comprising one end of a rod, the other end of which is threaded along a portion of its length,
   ii. coupling means connected with said valve and cooperating with said rotating shaft so as to open and close said valve at predetermined times during the rotation of said shaft and said rotor,
   iii. a nut threaded around said threaded end portion of said rod and adjustably movable along said threaded end portion;
   iv. stop means positioned adjacent to but unconnected with said rod between the ends thereof;
   v. an elongated inner compression spring positioned concentrically around said rod between said stop means and said nut, said spring having one end in engagement with said stop means and its opposite end in engagement with said nut whereby to apply a predetermined amount of force on said rod in the direction to close said valve;
   vi. an elongated outer compression spring positioned concentrically around said inner spring and said rod between said stop means and said nut, said outer spring having one end in engagement with said stop means and its opposite end in engagement with said coupling means, said coupling means being movable between a first position and a second position, in said first position, said coupling means engaging said nut such that said outer spring applies an additional force on said rod in the direction to close said valve and in said second position, said coupling means disengages itself with said nut so as to remove said additional force, g. means including one of said fluid sealing means, said entry area and a chamfered edge of one of said lobes as said edge moves into said combustion chamber at a predetermined point relative to said area defining a combustion sub-chamber smaller than but within said combustion chamber for further compressing said compressed mixture; and h. means for igniting said further compressed mixture within said sub-chamber to combust said mixture.

14. In a rotary internal combustion engine including a housing having two confronting but spaced apart side casings defining therebetween a plurality of chambers circumferentially spaced about a rotatably mounted shaft extending between said casings and a rotor mounted around said shaft for rotation therewith, said chambers including a combustion chamber and said engine further including means for delivering to said combustion chamber a compressed mixture of fuel and air, the improvement comprising:

a. a valve mechanism cooperating with said passage for metering a predetermined amount of said compressed mixture to said combustion chamber at predetermined points in time during rotation of said rotor, said valve mechanism including
   i. a valve housing defining a valve passage through which said mixture must pass to enter into said combustion chamber,
   ii. a rod shaped valve stem located within said valve housing and moveable between an opened position for opening said valve passage to allow said mixture to pass therethrough and a closed position for preventing said mixture from passing therethrough, said stem including a threaded portion,
   iii. a nut threaded around said threaded portion of said stem and adjustably movable along said threaded portion,
   iv. stop means positioned within said valve housing adjacent to but unconnected with said stem and spaced from said nut,
   v. an elongated inner compression spring positioned concentrically around said stem between said stop means and said nut, said spring having one end in engagement with said stop means and its opposite end in engagement with said nut, whereby to apply a predetermined amount of force on said stem in the direction to close said valve passage,
   vi. an elongated outer compression spring positioned concentrically around said inner spring and said stem between said stop means and said nut, said outer spring having one end in engagement with said stop means and its other end moveable into and out of engagement with said nut applying an additional force on said stem in the direction to close said valve passage and when out of engagement with said nut, additional force on said stem is removed, and
   vii. coupling means connected with said outer spring and cooperating with said rotating shaft so as to move said outer spring into and out of engagement with said nut at predetermined times during the rotation of said shaft and said rotor.

* * * * *